(12) United States Patent
Furuya et al.

(10) Patent No.: US 7,368,146 B2
(45) Date of Patent: May 6, 2008

(54) MAGNETO-OPTICAL RECORDING MEDIUM, MANUFACTURING METHOD THEREOF AND MAGNETO-OPTICAL DATA RECORDING AND PLAYBACK DEVICE

(75) Inventors: Akinori Furuya, Tokyo (JP); Hiroshi Yoshikawa, Tokyo (JP); Takaya Tanabe, Tokyo (JP); Manabu Yamamoto, Tokyo (JP); Toshifumi Ohkubo, Tokyo (JP); Laurence Bouet, Toulouse (FR); Philippe Tailhades, Paris (FR); Corine Despax, Paris (FR); Abel Rousset, Toulouse (FR)

(73) Assignees: Nippon Telegraph and Telephone Corporation, Tokyo (JP); The Centre National de la Recherche Scientifique, Paris Cedex (FR)

( * ) Notice: Subject to any disclaimer, the term of this patent is extended or adjusted under 35 U.S.C. 154(b) by 0 days.

(21) Appl. No.: 11/475,697

(22) Filed: Jun. 26, 2006

(65) Prior Publication Data

US 2006/0286411 A1 Dec. 21, 2006

Related U.S. Application Data

(60) Continuation of application No. 10/669,038, filed on Sep. 22, 2003, now abandoned, which is a division of application No. 09/529,919, filed on Apr. 21, 2000, now Pat. No. 6,759,137.

(30) Foreign Application Priority Data

| Aug. 28, 1998 | (JP) | ................................. 10-244156 |
| Apr. 1, 1999 | (JP) | ................................. 11-095518 |
| Aug. 30, 1999 | (WO) | ....................... PCT/JP99/04674 |

(51) Int. Cl.
*B05D 5/12* (2006.01)

(52) U.S. Cl. ...................... 427/130; 427/127; 427/128; 428/818; 428/822.2; 369/13.38

(58) Field of Classification Search ................ 427/130, 427/127, 128; 428/611, 637, 640, 678, 156, 428/167; 369/13.38
See application file for complete search history.

(56) References Cited

U.S. PATENT DOCUMENTS 4,608,142 A * 8/1986 Gomi et al. ............. 204/192.2

(Continued)

FOREIGN PATENT DOCUMENTS

FR 2655462 6/1991

(Continued)

*Primary Examiner*—Alain L. Bashore
(74) *Attorney, Agent, or Firm*—Thelen Reid Brown Raysman & Steiner LLP

(57) ABSTRACT

A magneto-optical recording medium has a recording layer and a reflective layer on a substrate. The recording layer has a layered structure in which at least one spinel ferrite (or rutile-type oxide or hematite) layer and at least one garnet ferrite layer are piled together. It is preferable that the layered structure is formed on tracks where data are recorded. A manufacturing method comprises the steps of heat treatment in the range of 500-700° C., preferably 600-630° C., after the formation of the recording layer. In the magneto-optical recording and playback device to record and play back data, the wavelength of light for recording data is different from that for reading data, which is preferable for a magneto-optical recording medium comprising a garnet ferrite layer.

2 Claims, 22 Drawing Sheets

U.S. PATENT DOCUMENTS

| | | | | |
|---|---|---|---|---|
| 4,883,710 A | * | 11/1989 | Machida | 428/336 |
| 5,146,361 A | * | 9/1992 | Licht | 359/280 |
| 5,169,504 A | * | 12/1992 | Bechevet et al. | 204/192.26 |
| 5,879,783 A | * | 3/1999 | Chang et al. | 428/141 |

FOREIGN PATENT DOCUMENTS

| | | |
|---|---|---|
| JP | 60018833 | 1/1985 |
| JP | 61039954 | 2/1986 |
| JP | 64017247 | 1/1989 |

* cited by examiner

X-RAY (Kα) DIFFRACTION INTENSITY

MAGNETO-OPTICAL RECORDING MEDIUM, MANUFACTURING METHOD THEREOF AND MAGNETO-OPTICAL DATA RECORDING AND PLAYBACK DEVICE

CROSS-REFERENCE TO RELATED APPLICATION

This application claims the benefit of U.S. application Ser. No. 10/669,038, filed on Sep. 22, 2003 now abandoned, entitled "MAGNETO-OPTICAL RECORDING MEDIUM, MANUFACTURING METHOD THEREOF AND MAGNETO-OPTICAL DATA RECORDING AND PLAYBACK DEVICE" (Akinori Furuya, Hiroshi Yoshikawa, Takaya Tanabe, Manabu Yamamoto, Toshifumi Ohkubo, Laurence Bouet, Philippe Tailhades, Corine Despax-Bonningue, Abel Rousset) under 35 USC § 120, which is a divisional application of U.S. application Ser. No. 09/529,919, filed on Apr. 21, 2000 now U.S. Pat. No. 6,759,137, entitled "MAGNETO-OPTICAL RECORDING MEDIUM, MANUFACTURING METHOD THEREOF AND MAGNETO-OPTICAL DATA RECORDING AND PLAYBACK DEVICE" (Akinori Furuya, Hiroshi Yoshikawa, Takaya Tanabe, Manabu Yamamoto, Toshifumi Ohkubo, Laurence Bouet, Philippe Tailhades; Corine Despax-Bonningue, Abel Rousset).

BACKGROUND OF THE INVENTION

1. Field of the Invention

This invention relates to a magneto-optical recording medium such as magneto-optical disk and card, a manufacturing method for the medium and a magneto-optical recording and playback device to record and play back data using the magneto-optical recording medium. This invention specially relates to a magneto-optical recording medium having a recording layer comprising a garnet ferrite layer and being ideal for high density and proximity recording, a manufacturing method for the medium and a magneto-optical recording and playback device for the medium.

2. Background Art

In conventional magneto-optical recording media on the market, the recording layer is mainly made from a thin metal layer. Data are recorded onto the recording layer as recorded bits by changing the optical properties such as the transmission or reflection rate of minute spots on the recording layer by a light beam for recording data. An amorphous alloy of rare earth metals such as TbFeCo is a typical material for the thin metal layer, and the alloy is favorable for recording data because it generally has a high absorption coefficient ($>10^5$ $cm^{-1}$). However, the thin metal layer is prone to deterioration due to oxidation and other factors. For this reason, it has to be sealed and protected by a plastic layer, for example.

On the other hand, a magneto-optical recording medium having a recording layer that consists of an oxide such as garnet ferrite, which is a kind of ferrite having a garnet type structure of crystals and has a large Faraday rotation angle, has been developed. In such a recording medium, the degree of deterioration of properties due to oxidation is smaller than that of the case in which a metal material is used for the recording layer, because the material itself of the recording layer is already an oxide. Therefore, it has the distinctive feature that the above mentioned special protection is not necessary.

In the case in which garnet ferrite is used as the material for magneto-optical recording, however, internal stress occurs in a garnet ferrite layer when spattering for formation of the layer on a substrate. This sometimes results in cracks in the garnet ferrite layer, rough morphology of the surface of the layer and very large crystal particles, which are not preferable because they cause the problem of medium noise when recording and playing back. In order to overcome the above-mentioned problems, a method for improvement of the morphology of the layer by adjusting the thermal expansion coefficient of the substrate and by performing inverse spattering, for example, after annealing, is disclosed in Japanese Patent Publication No. Hei 8-249740 (1996).

Meanwhile, a new type of recording layer having a plurality of layers made from several kinds of materials for magneto-optical recording has recently been developed for the purpose of improvement of the S/N and C/N ratio. However, it is said that metal materials such as the above amorphous alloy are not suitable for multi-layered structures since they have a relatively small Kerr Effect and a high absorption coefficient. As a result, a recording layer having multiple-layers made from garnet ferrite, which is known as an oxide-type material for optical recording and which has large Faraday Effect, has attracted much attention. For instance, a multi-layered recording medium having piled layers made from bismuth-substituted type garnet ferrite having an excellent Faraday rotation angle in the wavelength range of visible light has been proposed (see Itoh, Koike, Numata, Inoue and Kawanishi "Multi-Layered Magnetic Garnet Ferrite Film for Magneto-Optical Recording", Abstract of 10th Academic Lectures for Application of Magnetics in Japan, p. 31, November 1986).

However, a multi-layered recording medium having a recording layer made from bismuth-substituted garnet ferrite requires a high power light beam when writing data because the absorption coefficient of the recording layer is small. Taking this problem into consideration, Japanese Patent Publication No. Hei 6-282868 discloses a multi-layered type magneto-optical recording medium having a light absorption layer which accelerates the recording process by efficient transfer of the applied by a light beam to a recording layer which is near the light absorption layer. However, the above mentioned magneto-optical recording medium uses direct energy gap semiconductors such as GaAs, InP, CdS, CdSe, ZnSe and ZnS, which are easily oxidized during layer formation, as the light absorption layer. Therefore, a protective layer is required on the surface of the light absorption layer. The protective layer is formed by deposition of $SiO_2$, $Al_2O_3$, $TiO_2$ or the like in the range of 2~100 μm by a CVD method or spattering to create a film. Accordingly, the manufacturing process shown in Japanese Patent Publication No. 6-282868 becomes complex because formation of the light absorption layer and the protective layer is necessary in addition to formation of the recording layer, which leads to increased production costs. Besides, properties such as the S/N ratio of the magneto-optical recording medium manufactured by the above method have not yet reached a satisfactory level.

Japanese Patent Publication No. Hei 6-290497 (1994) discloses a manufacturing method for a magneto-optical recording medium having a recording layer that has a double-layered garnet ferrite structure, in which a non-magnetic garnet ferrite underlayer is used, and discloses that the multi-recording layer keeps the garnet ferrite crystal particle diameter at 1 μm or below to reduce the disparities in bit shapes and medium noise. However, the above method is impractical because the manufacturing process is complex. Further, in the case in which the multi-layered structure is formed by two types of garnet ferrite having different compositions, the elements in each garnet ferrite layer disperse at the vicinity of layer boundaries after heat treatment. Therefore, compositional deviations occur in the direction perpendicular to the layer surface in the multi-layered structure, which causes the problem of deterioration of properties such as the S/N ratio and repeatability. Furthermore, high density recording is hindered if the above mentioned method is employed because it is impossible for the above mentioned garnet ferrite layer formation method to provide minute crystals on the order of nanometers.

On the other hand, various approaches to the improvement of the S/N and C/N ratios have been examined from not only the aspect of the magneto-optical recording medium itself but also from the aspect of devices for recording and playing back data on the magneto-optical recording medium.

The method to realize high resolving power by raising the optical refraction rate by fulfilling a liquid between a sample and an object lens is known. An application of this method using a small solid lens has been proposed under the name of SIL lens (Appl. Phys. Lett., 57(24), 1990; U.S. Pat. No. 5,004,307). And, a data recording and playback system using the SIL lens for magneto-optical recording medium has been also proposed (U.S. Pat. No. 5,125,750). This system is characterized in that the distance between the SIL lens and the recording layer of the recording medium is kept within the wavelength of the light, namely on the sub-micron order, so as to gain a small focus spot diameter which is a feature of the SIL lens, and so as to gain an increase in the recording density. However, even in this system, the S/N and C/N ratios have not yet reached a satisfactory level. Besides, this system lacks generality because it is not suitable for a magneto-optical recording medium that has a relatively thick protective layer, which is, for example, disclosed in Japanese Patent Publication No. Hei 6-282868.

SUMMARY OF THE INVENTION

The present invention was made referring to the state of the prior art mentioned above. The present invention aims to provide data recording and playback with excellent S/N and C/N ratios, from the both aspects of a magneto-optical recording medium and a magneto-optical recording and playback device. Namely, it is an object of the present invention to produce a new magneto-optical recording medium that has a recording layer containing a garnet ferrite layer, which has high resolution, high recording density, high S/N and C/N ratios and the magnet properties of which can be easily controlled.

It is another object of the present invention to produce a new magneto-optical recording and playback device that is suitable for data recording and playback on such a magneto-optical recording medium and is able to increase the S/N and C/N ratios.

The above mentioned object is achieved by a magneto-optical recording medium having a recording layer and a reflective layer on a substrate characterized in that the recording layer has a layered structure in which a garnet ferrite layer and any one of a spinel ferrite layer, a rutile-type oxide layer and a hematite layer are layered. The layered structure in the recording layer is preferably present at least on tracks in which data are recorded. If the layered structure is not present between the tracks, it is preferable that only a garnet ferrite layer be present between the tracks.

The recording layer may be located between the substrate and the reflective layer. On the other hand, the reflective layer may be located between the substrate and the recording layer. The preferable thickness of the garnet ferrite layer is 40 to 400 nm, and that of the spinel ferrite layer, the rutile-type oxide layer and the hematite layer is 10 to 100 nm. The recording layer may have a multi-layer structure in which a plurality of garnet ferrite layers and a plurality of spinel ferrite layers, rutile-type oxide layers and hematite layers are layered. If so, the preferable thickness of the recording layer is 40 to 1000 nm.

Further, grooves may be formed on, or loads may be attached to the surface of at least one of the substrate, the reflective layer or the recording layer. Here, a "load" is a member to change the effective reflection index on the surface of the layers, which has a rectangular section in general and forms convexities on the surface of the layers to which it is attached. The material of the load is not restricted.

In the magneto-optical recording medium of the present invention, a transparent layer may be formed on the surface of the recording layer or the reflective layer. If so, grooves may be formed on the surface of the transparent layer.

The magneto-optical recording medium of the present invention can be produced by a manufacturing method characterized by comprising a step of heat treatment at a temperature of 500 to 700° C., preferably 600 to 630° C., after the formation of the recording layer.

The other object of the present invention mentioned above is achieved by a magneto-optical recording and playback device to record and play back data by use of a magneto-optical recording medium, characterized in that the wavelength of light is different for recording data into the magneto-optical recording medium and for reading data from the magneto-optical recording medium. This magneto-optical recording and playback device can be used for a magneto-optical recording medium having a recording layer comprising a garnet ferrite layer, preferably for a magneto-optical recording medium having a recording layer and a reflective layer on a substrate, and the recording layer having a layered structure in which a garnet ferrite layer and any one of a spinel ferrite layer, a rutile-type oxide layer and a hematite layer are layered. It is preferable that the light for recording and reading are provided by one light source.

This invention has the effect that a garnet ferrite-type reading medium having excellent magnetic properties and suitable as a magneto-optical recording medium can be produced without a complicated process. And, passivation does not occur since no metal-type material is used as the magneto-optical recording material.

Besides, a magneto-optical recording medium with high anisotropy, high resolution, high recording density and low noise can be produced since a garnet ferrite layer having minute morphology suitable for high density recording can be obtained, and internal stress in a recording layer can be cancelled by a combination of a spinel ferrite layer, a rutile-type oxide layer or a hematite layer with the garnet ferrite layer. Further, the control of the magnetic properties of the garnet ferrite layer is easily accomplished. Further, the S/N ratio of the recording medium is remarkably improved because of the synergistic effect of high output effect derived from the enormous Faraday effect originally provided by the garnet ferrite and the low noise effect.

In the case in which the reflective layer is located between the substrate and the recording layer, the production process of the magneto-optical recording medium can be simplified and the production costs can be reduced since a protective film is not necessary even if the reflective layer is made of metal-type material. Further, in this case, an optical pickup mechanism such as a read head can be set substantially closer to the medium surface during playback since there is no protective film. This makes it possible to obtain a higher S/N ratio than before.

In the case in which the recording layer comprises a plurality of garnet ferrite layers and a plurality of spinel ferrite layers, rutile-type layers or hematite layers, the number of heat treatments can be reduced. And, it is easy to obtain a recording layer having excellent magnetic properties since precise control of the stress in the recording medium is possible.

Further in the case in which grooves are formed, or loads are attached to the surface of at least one of the substrate, the reflective layer or the recording layer, servo control of the recording position on the recording medium can be carried out.

Further, if a transparent layer is layered on the surface of the recording layer or the reflective layer, the light irradiated from a playback head and focused on the recording layer will not be subject to the effects of dust and scratches on the surface of the recording medium. Incidentally, if grooves are formed on the transparent layer, the grooves can be utilized as guides for the servo control.

According to the manufacturing method of the magneto-optical recording medium of the present invention, it is possible to endow with magnetic properties only to the garnet ferrite layer present on the track parts, and to make the garnet ferrite layer except for the track parts non-magnetic by control of the temperature of the heat treatment. Therefore, it is possible to reduce the noise derived from parts other than the tracks, and the S/N ratio increases considerably because of the synergistic effect of the high output derived from the enormous Faraday effect originally provided by the garnet ferrite and the noise reduction effect. Further, it is also possible to reduce the magnetic interference with the data recorded in the track parts from the parts other than the track parts.

The manufacturing method of the present invention can produce a magneto-optical recording medium having a layered structure in which a garnet ferrite layer and any one of a spinel ferrite layer, a rutile-type oxide layer and a hematite layer are layered, at least on tracks in which data are recorded, as well as the other magneto-optical recording media of the present invention. And, in the case in which a reflective layer is located between a substrate and a recording layer, no protective means such as a coating layer for the reflective layer is necessary even if the reflective layer is made of metal type materials. Therefore, it is possible to simplify the manufacturing process and to reduce the production cost. Furthermore, it is possible to locate a light pick-up mechanism such as a reading head substantially closer to the recording layer, which results in a increase of the S/N ratio.

If the magneto-optical recording medium of the present invention has a transparent layer other than the substrate, compatibility with a conventional medium can be obtained, and a light beam focused on the recording layer will be less affected by dust that may be adhering to the surface of the recording medium or by scratches that may be present thereon. If grooves are formed on the surface of the transparent layer, servo control of the recording position becomes possible by detecting the change of the refraction and reflection rate on the surface of the transparent layer, which is caused by the grooves.

Taking the light absorption properties of a magneto-optical recording medium to be used into consideration, in the magneto-optical recording and playback device of the present invention, the wavelength of light is set to be different for recording data and reading data. Therefore, the S/N ratio and C/N ratio can be increased by optimizing the recording and playback, referring to the properties of the medium to be used.

For example, if the light absorption rate of the magneto-optical recording medium is high for light with a short wavelength, efficient data recording and reduction of the power of the light beam for data recording are possible by shortening the wavelength of the light beam for data recording. On the other hand, if the light absorption rate of the magneto-optical recording medium is low for light with a long wavelength, reducing undesirable heating of a recording layer is possible by lengthening the wavelength of the light beam for data reading, and increasing of C/N ratio is possible because a reflected light beam with high power can be obtained.

The magneto-optical recording and playback device of the present invention can be preferably used for the magneto-optical recording medium of the present invention that has a garnet ferrite layer.

Figure 3A:
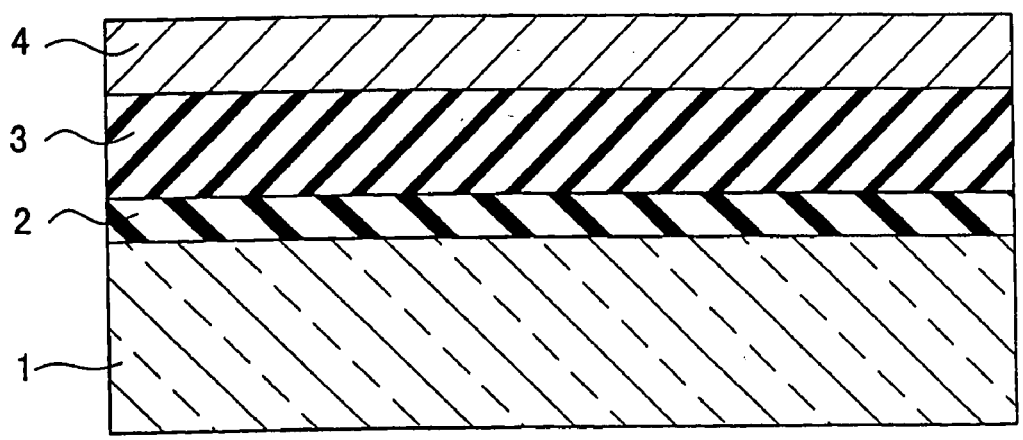
FIG. 3 is a figure showing two types of section structure of a magneto-optical recording medium having two layers of garnet ferrite/spinel ferrite (or rutile-type oxide, or hematite).
Figure 3B:
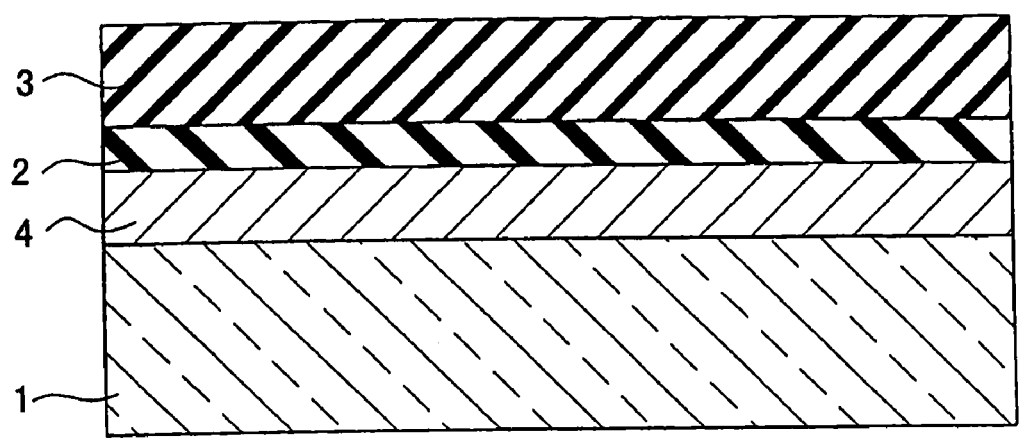
Figure 6A:
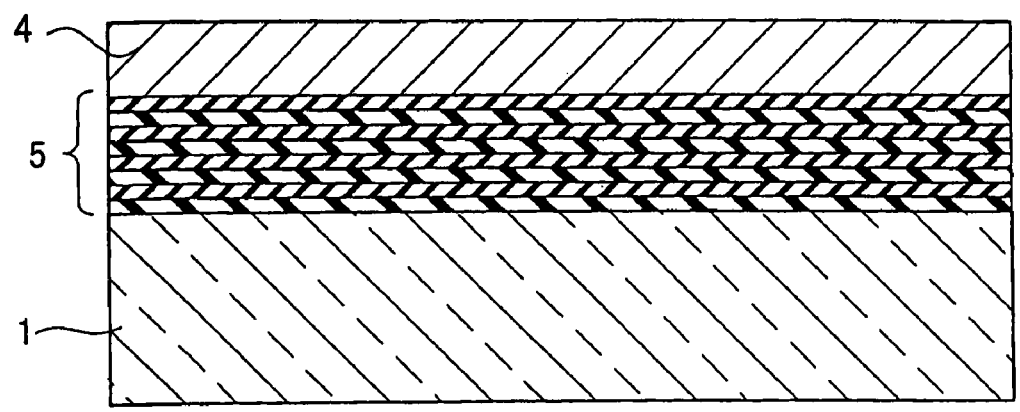
FIG. 6 is a figure showing two types of section structure of a magneto-optical recording medium having a recording layer which consists of multiple layers of garnet ferrite/spinel ferrite (or rutile-type oxide, or hematite).
Figure 6B:
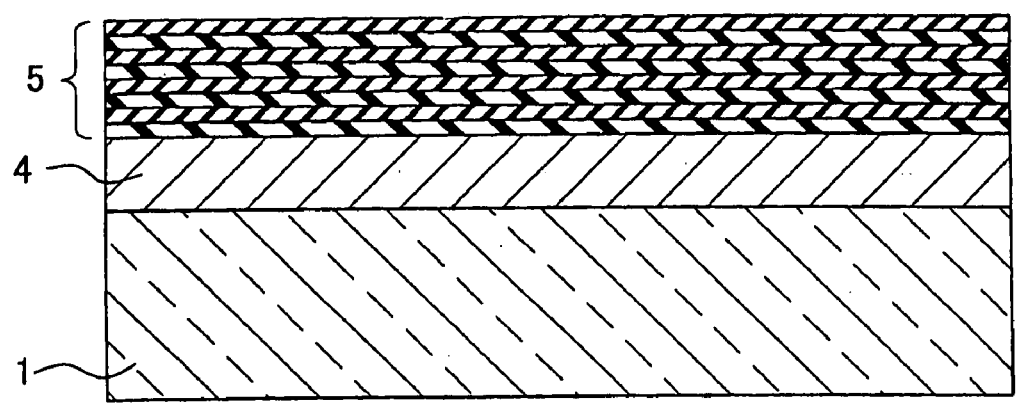
Figure 12A:
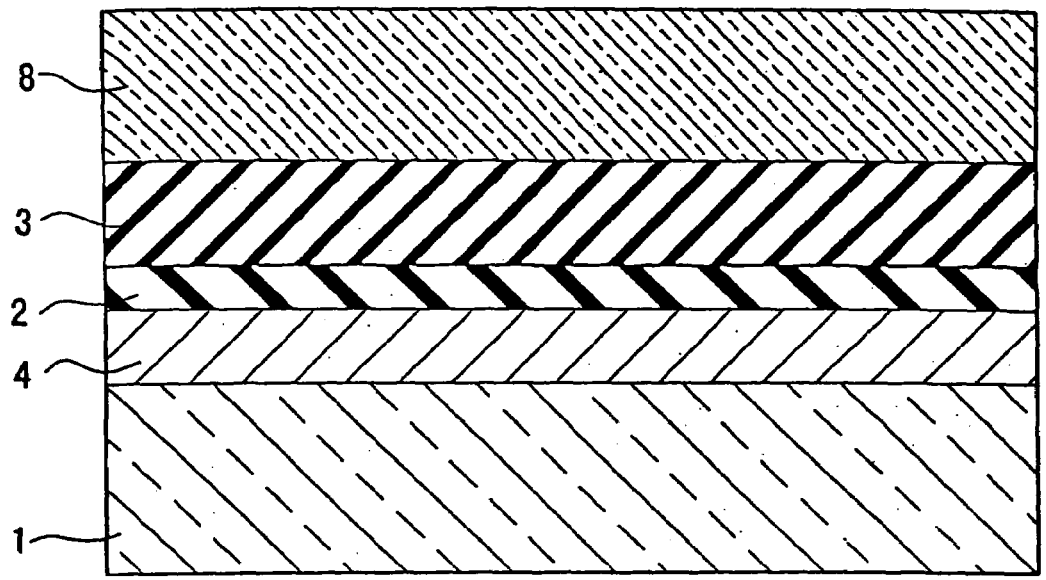
Figure 12B:
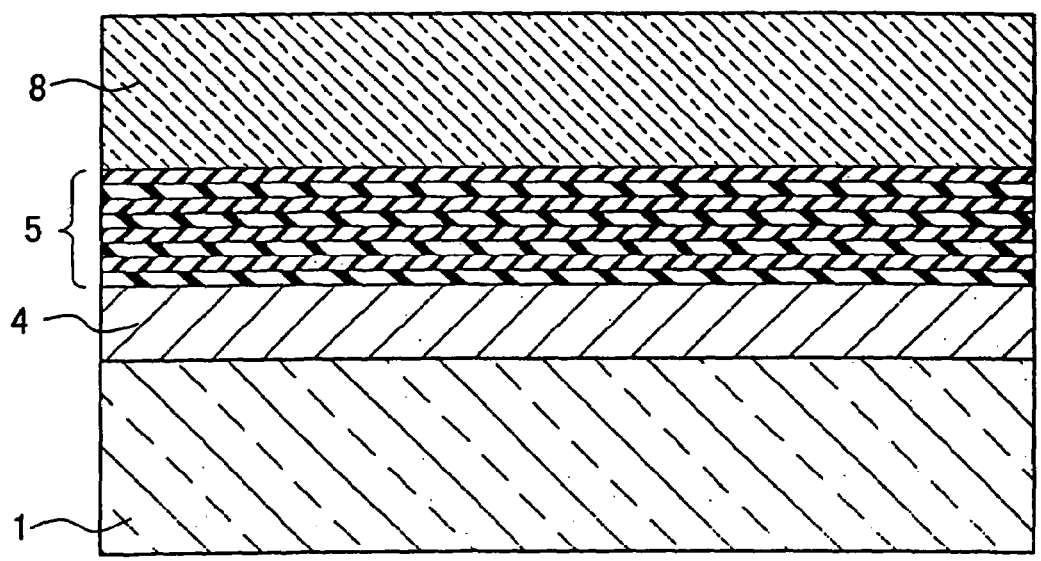

FIG. 12 is a figure showing two types of section structure corresponding to FIG. 3 (b) and FIG. 6 (b), and on which transparent layers are formed.

Figure 7A:
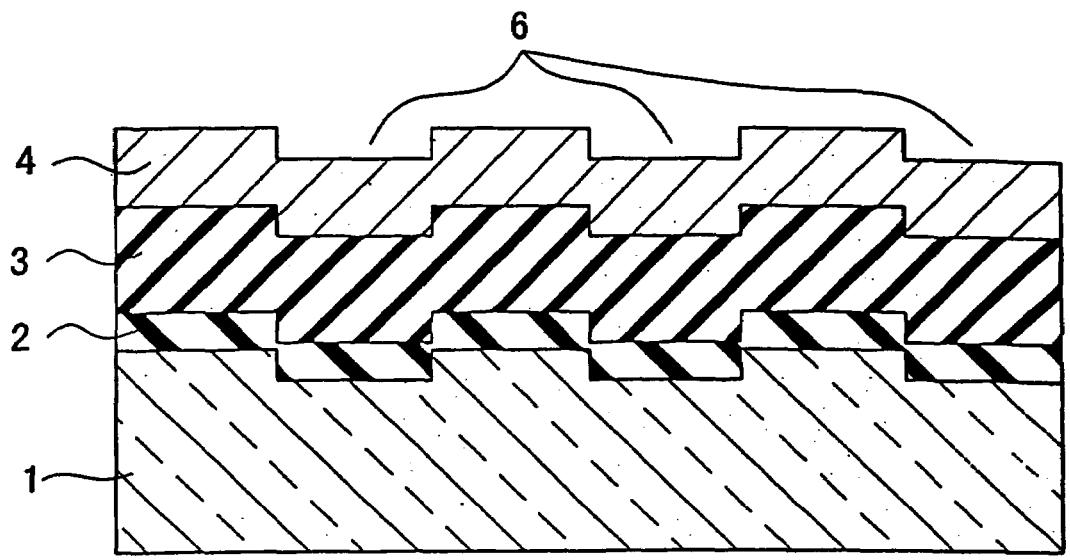
FIG. 7 is a figure showing two types of section structure of a magneto-optical recording medium which has two layers of garnet ferrite/spinel ferrite (or rutile-type oxide), and on which grooves for servo control are formed.
Figure 7B:
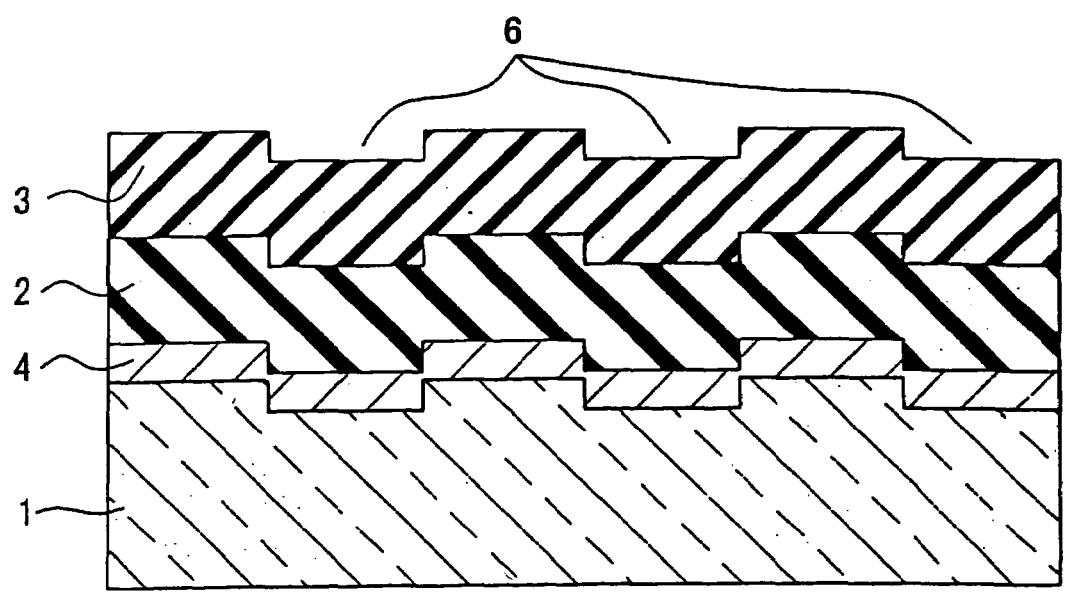
Figure 8A:
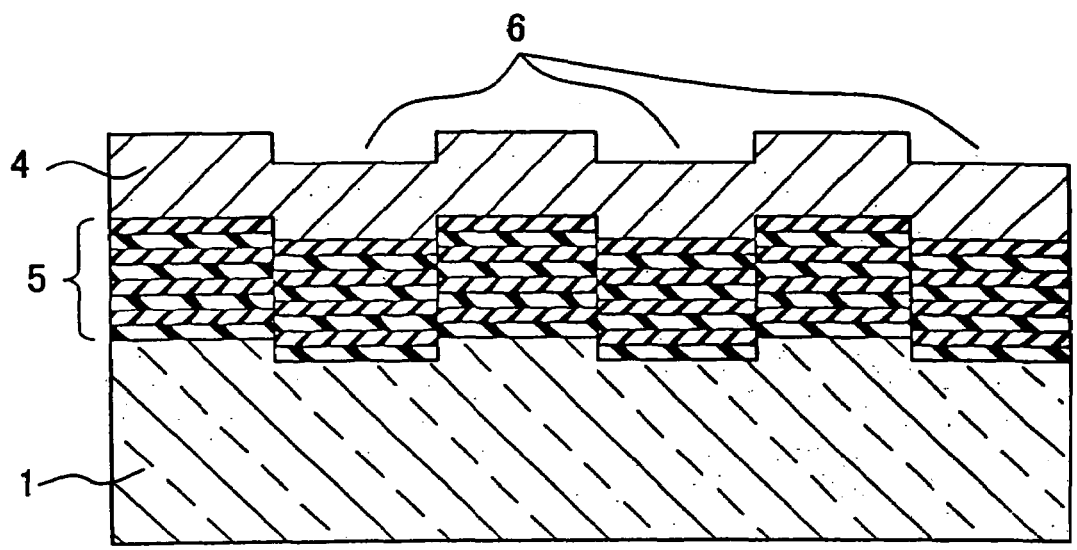
FIG. 8 is a figure showing two types of section structure of a magneto-optical recording medium having a recording layer which consists of multiple layers of garnet ferrite/spinel ferrite (or rutile-type oxide, or hematite), and on which grooves for servo control are formed.
Figure 8B:
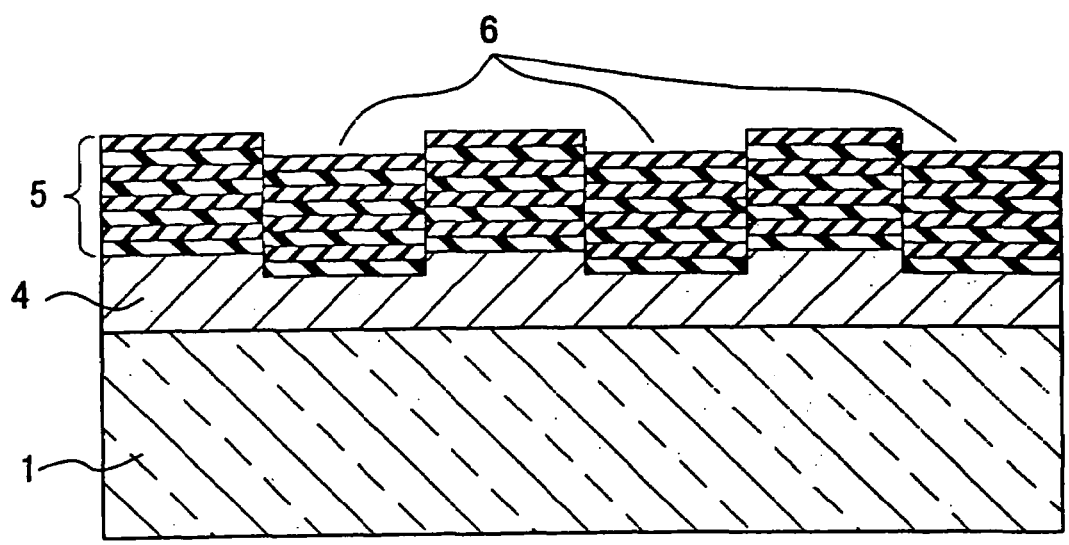
Figure 13A:
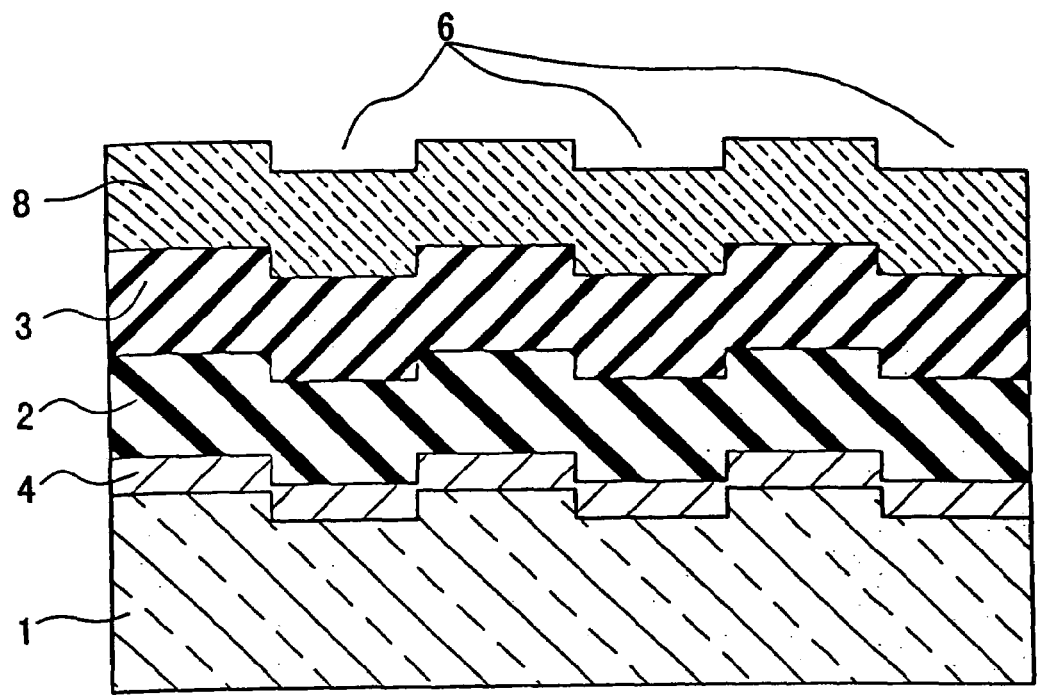
Figure 13B:
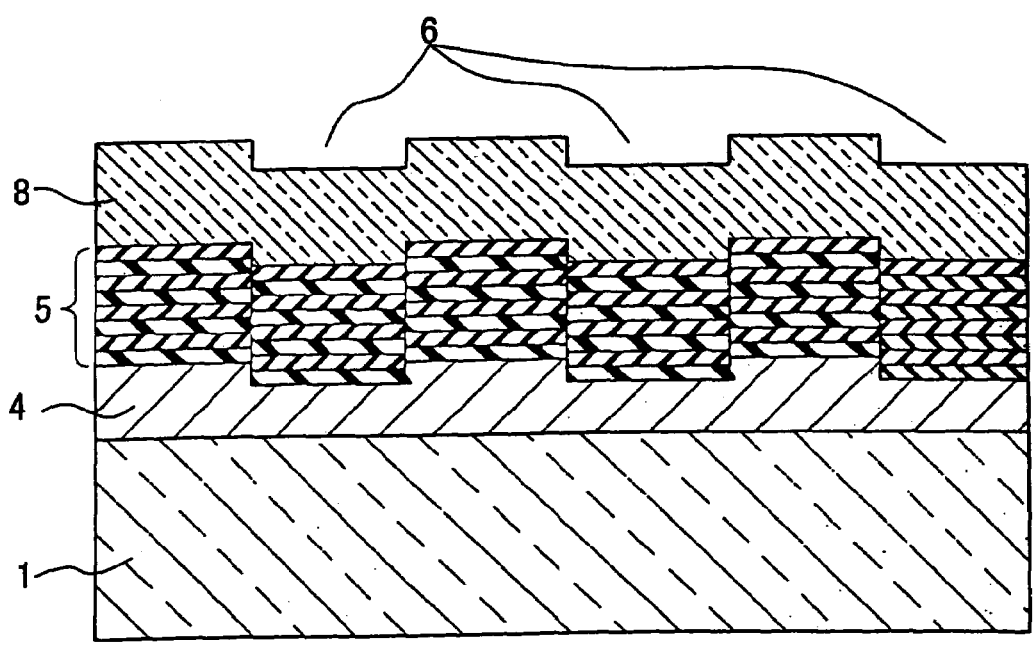

FIG. 13 is a figure showing two types of section structure corresponding to FIG. 7 (b) and FIG. 8 (b), and on which transparent layers are formed.

Figure 14A:
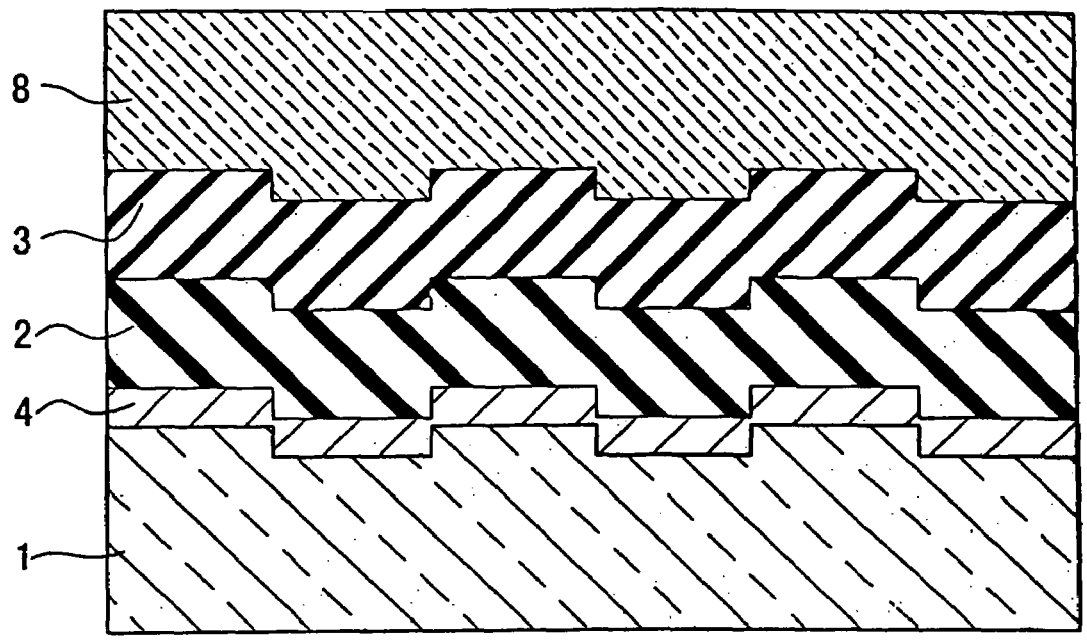
Figure 14B:
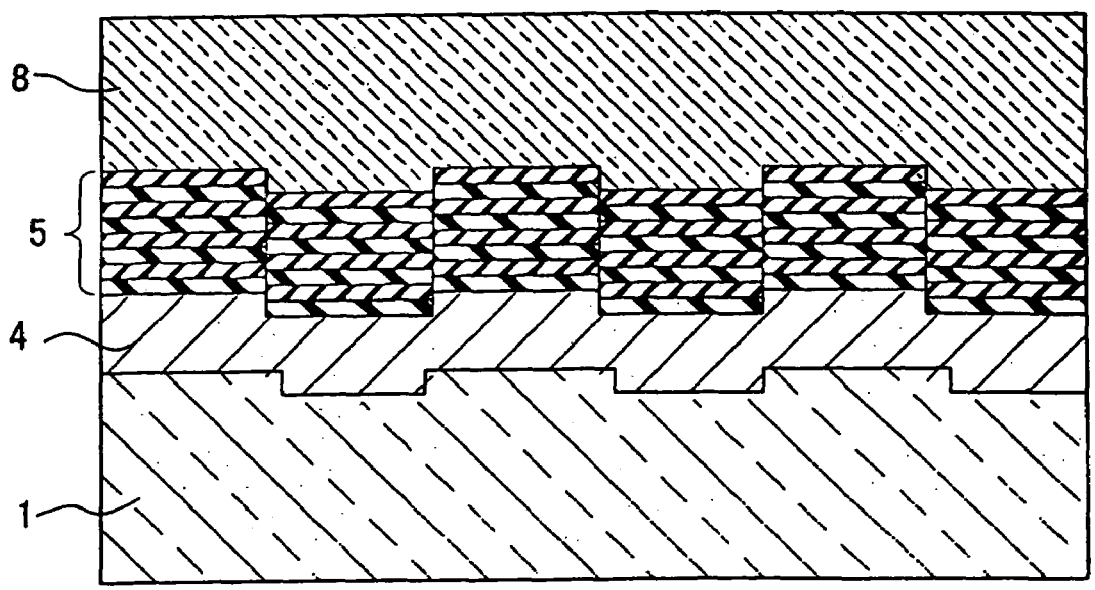

FIG. 14 is a figure showing two types of section structure corresponding to FIG. 13, and flattening is done for the surface the transparent layers.

Figure 9A:
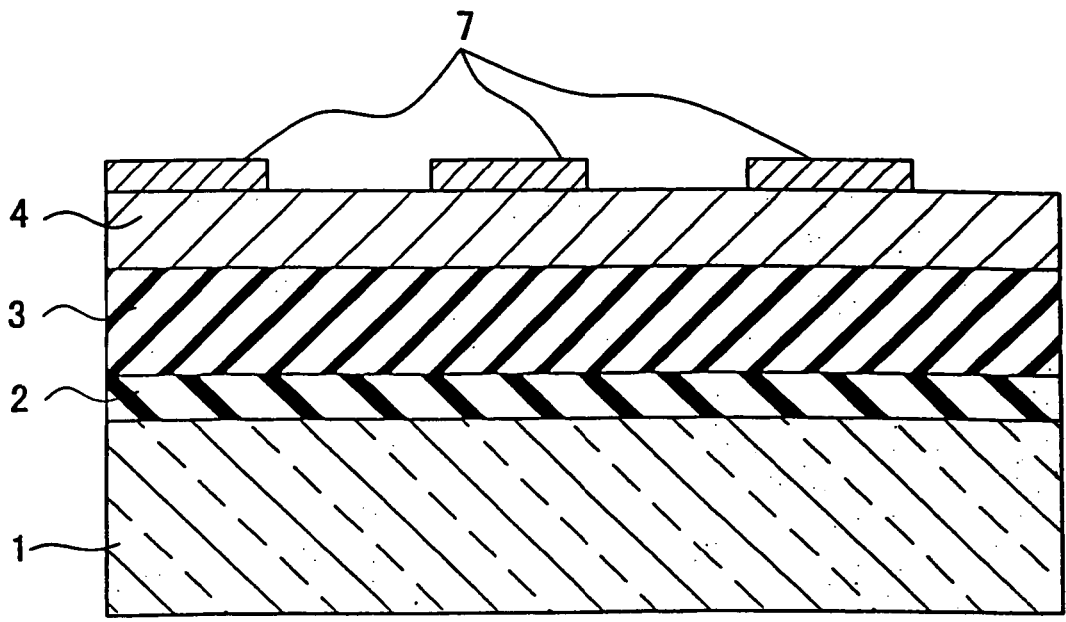
FIG. 9 is a figure showing two types of section structure of a magneto-optical recording medium having a recording layer which consists of two layers of garnet ferrite/spinel ferrite (or rutile-type oxide), and on which loads for servo control are attached.
Figure 9B:
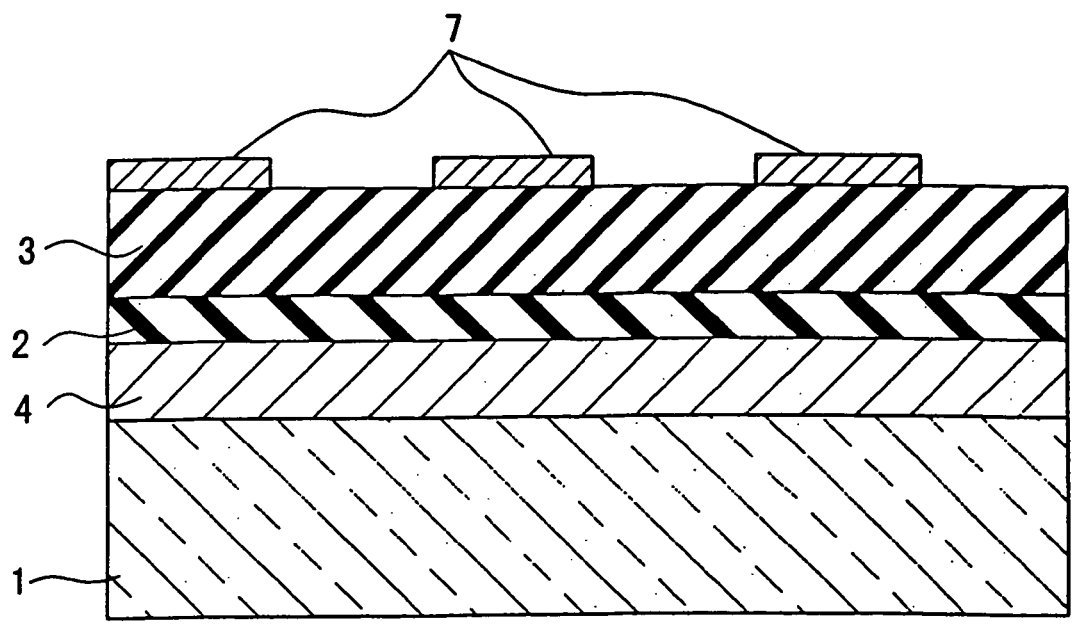
Figure 10A:
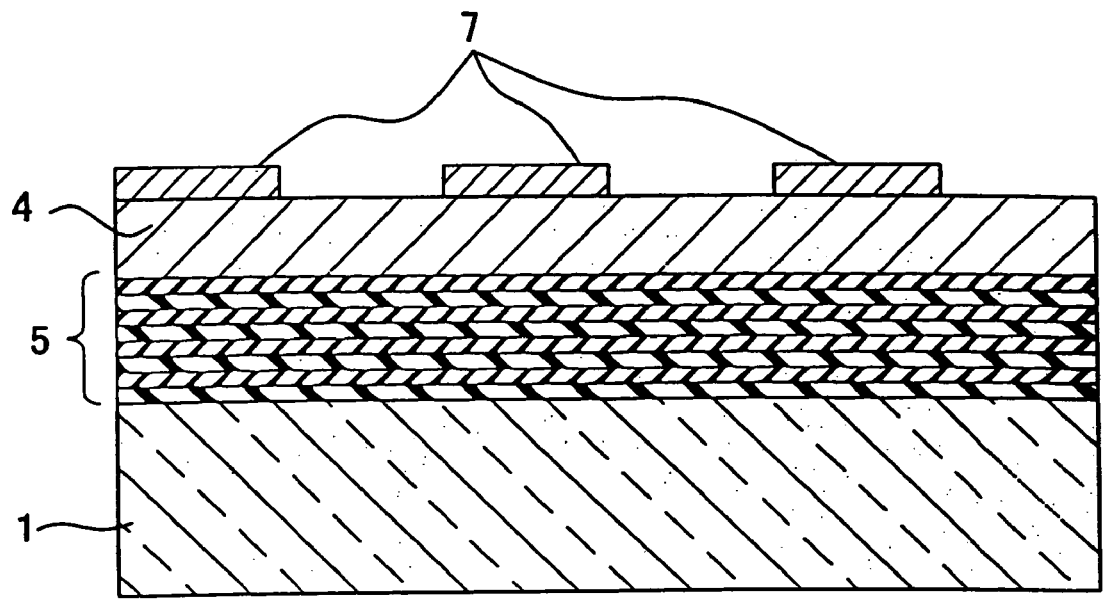
FIG. 10 is a figure showing two types of section structure of a magneto-optical recording medium having a recording layer which consists of multiple layers of garnet ferrite/spinel ferrite (or rutile-type oxide, or hematite), and on which grooves for servo control are formed.
Figure 10B:
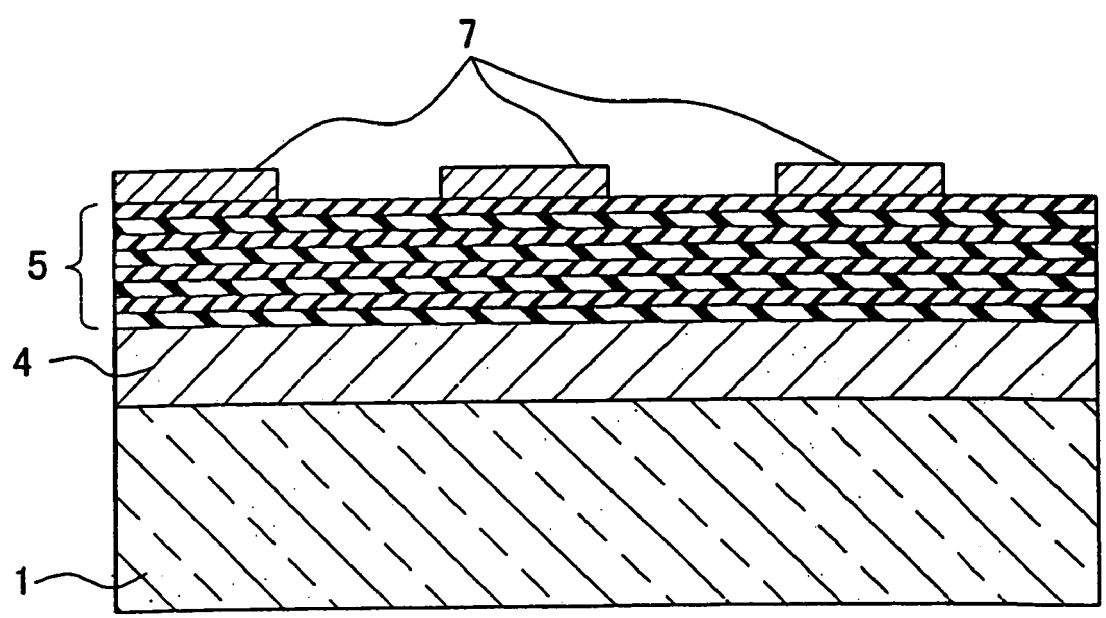
Figure 15A:
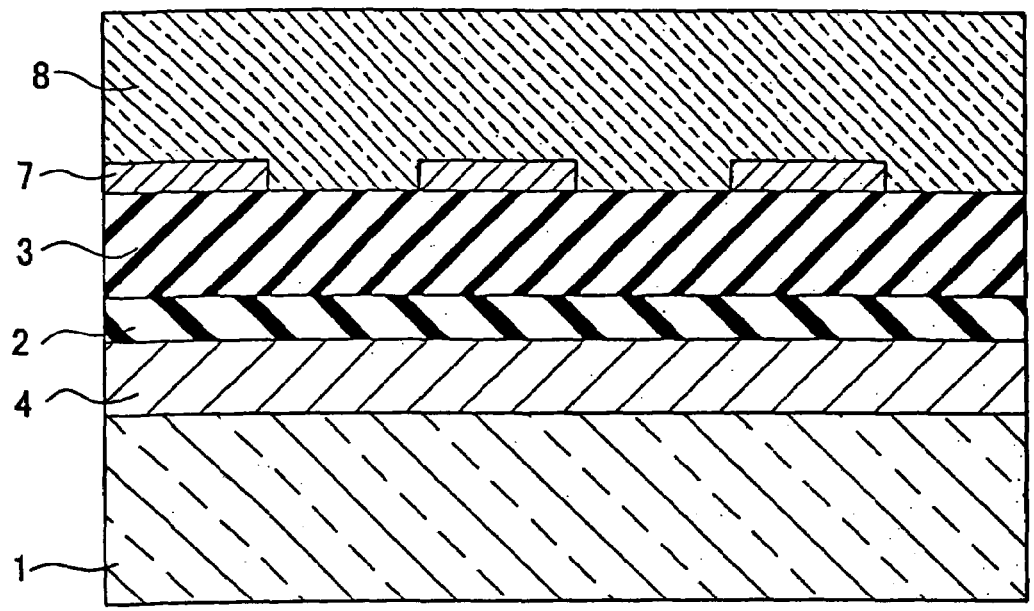
Figure 15B:
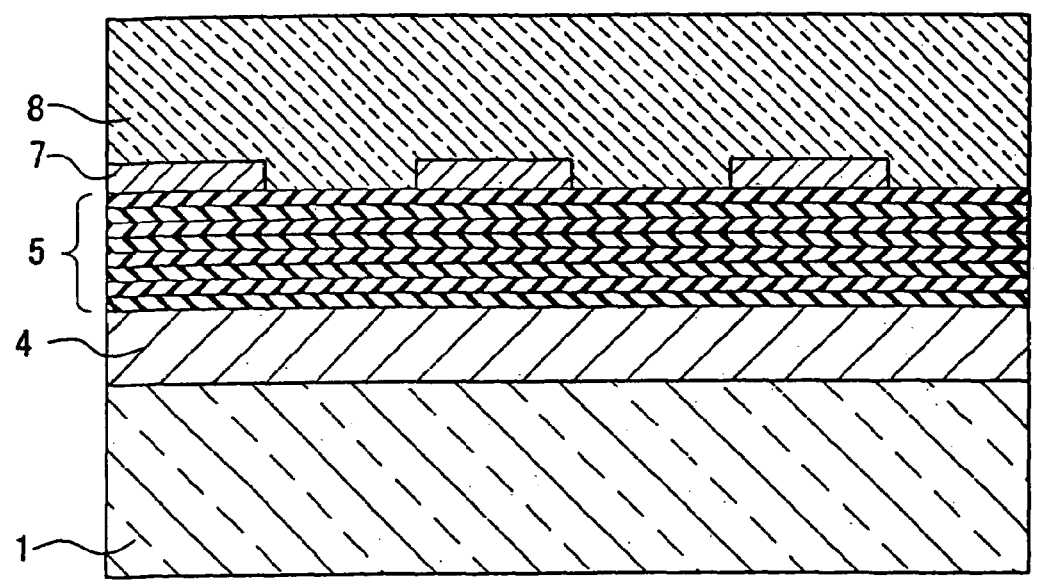

FIG. 15 is a figure showing two types of section structure corresponding to FIG. 9 (b) and FIG. 10 (b), and on which transparent layers are formed.

Figure 16A:
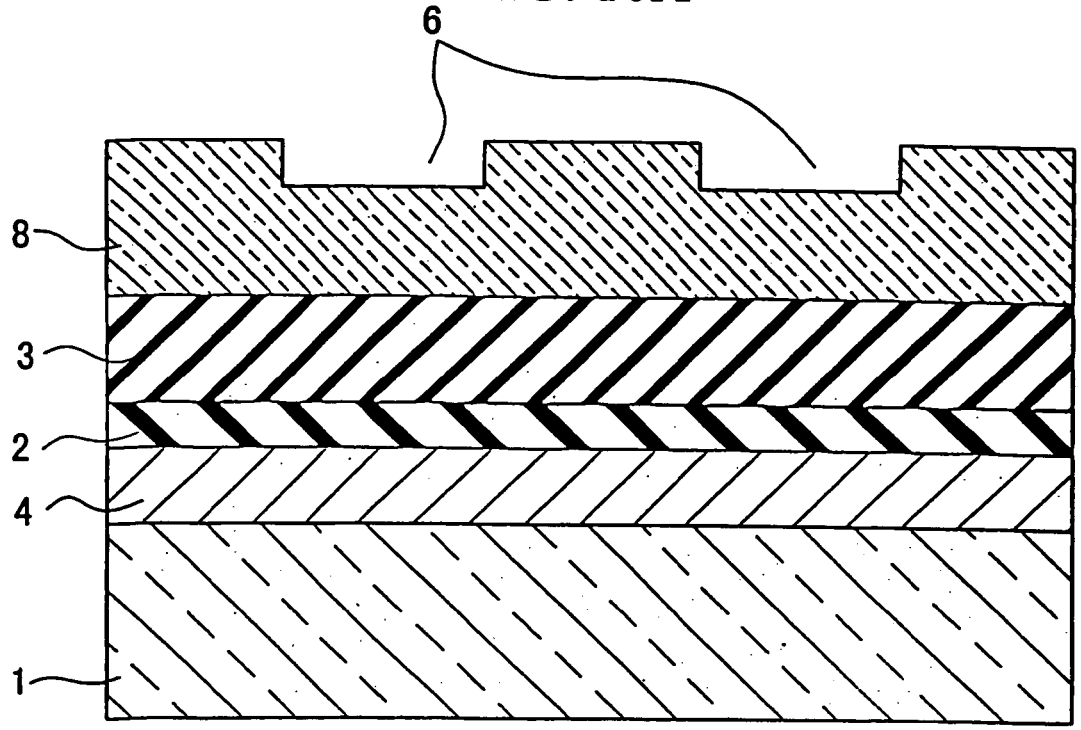
Figure 16B:
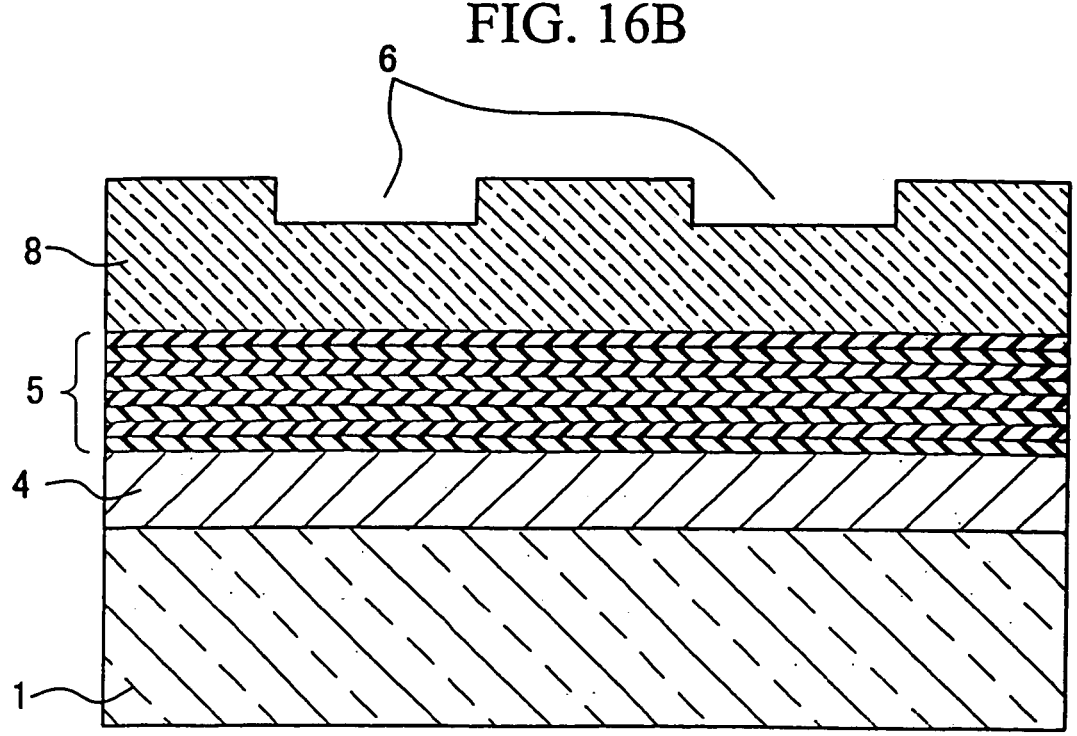

FIG. 16 is a figure showing two types of section structure corresponding to FIG. 12 (a) and (b), and on which grooves for servo control are attached.

Figure 17:
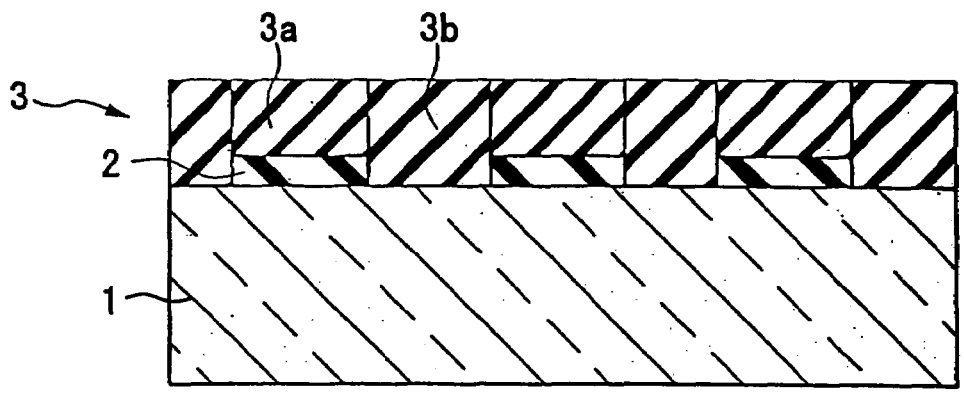

FIG. 17 is a figure showing a section structure of the magneto-optical recording medium having a recording layer in which spinel ferrite layers are formed on tracks.

Figure 18A:
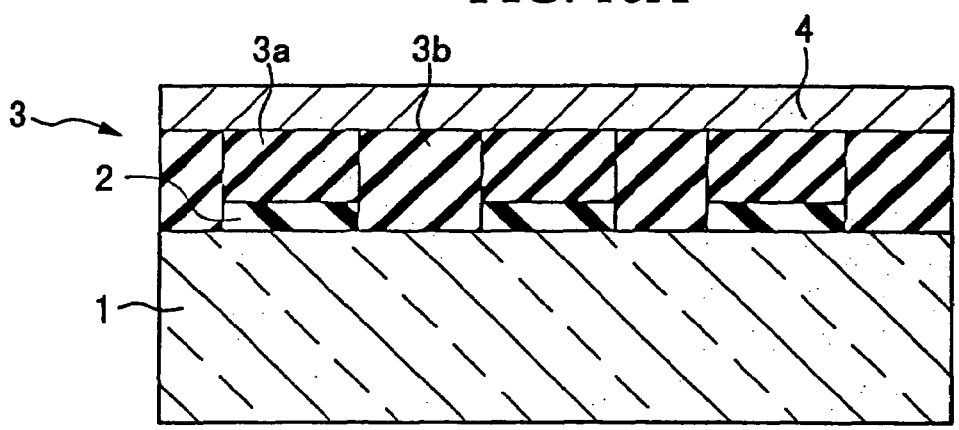
Figure 18B:
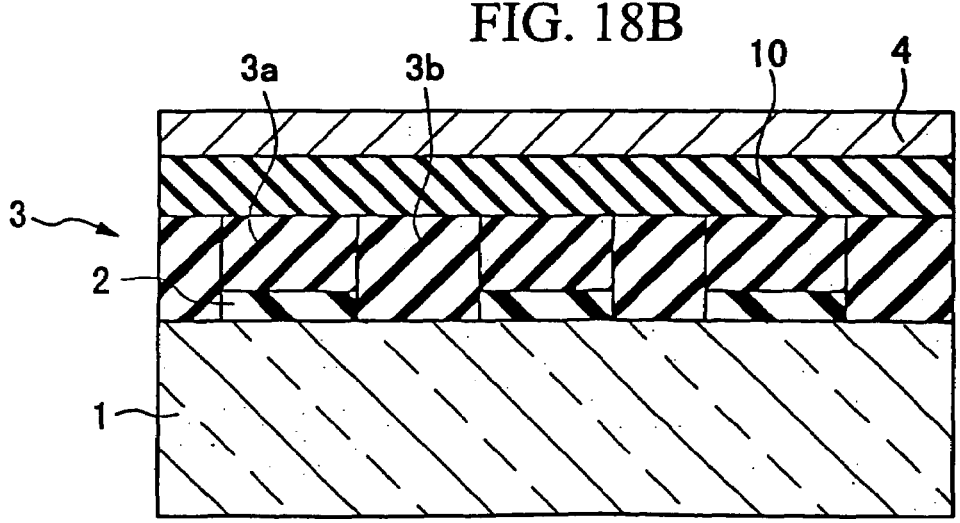

FIG. 18 is a figure showing a section structure of the magneto-optical recording medium of FIG. 17, a garnet ferrite layer of which is directly or indirectly coated with a metal reflective layer.

Figure 19:
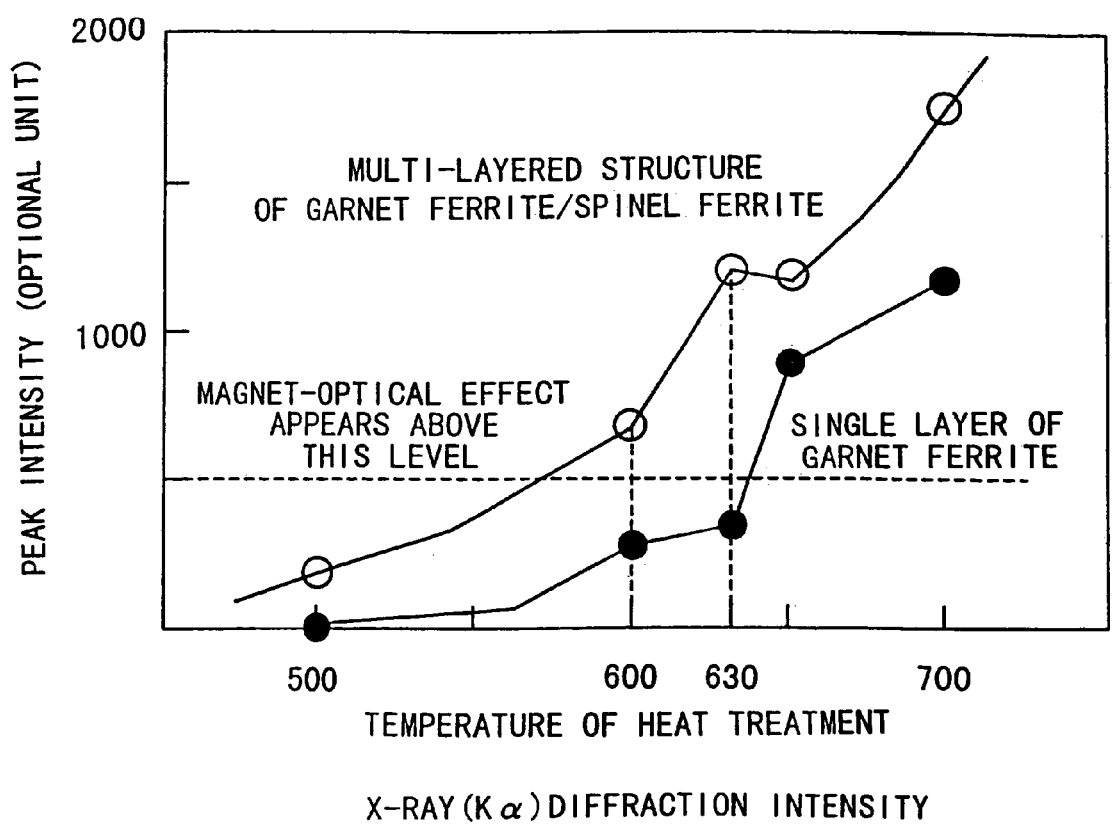

FIG. 19 is a graph showing X-ray diffraction intensity of magneto-optical recording media, one of which has a recording layer that consists of a single layer of garnet ferrite, and the other of which has a recording layer that consists of two layers of spinel and garnet ferrite.

Figure 20:
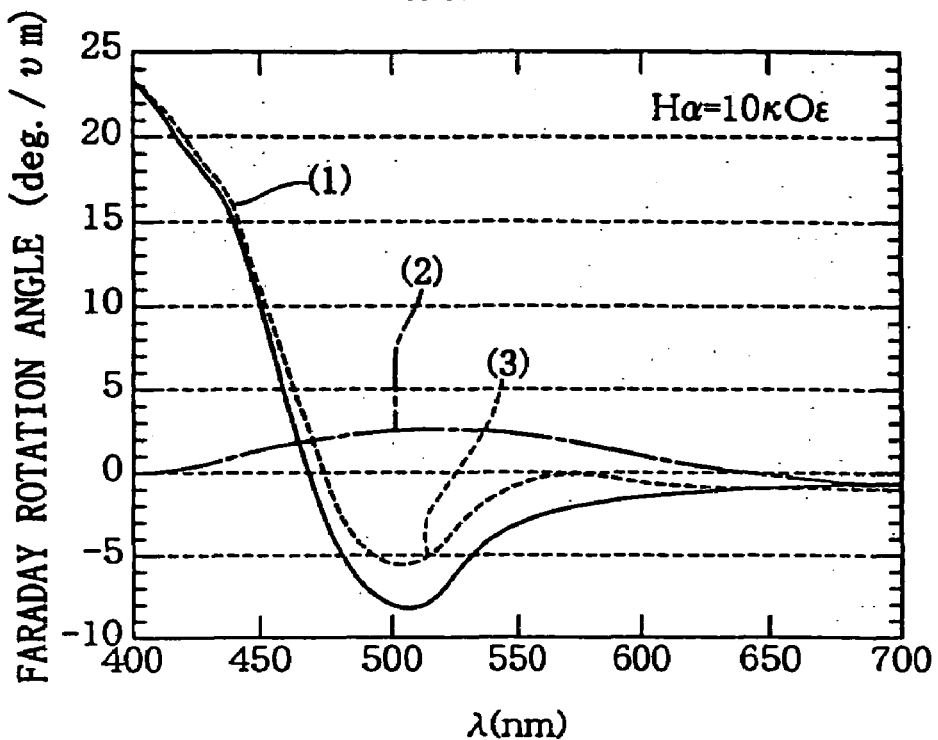

FIG. 20 is a graph showing the dependence of the Faraday rotation angle of magneto-optical recording media having various recording layers on the wavelength of light.

Figure 21:
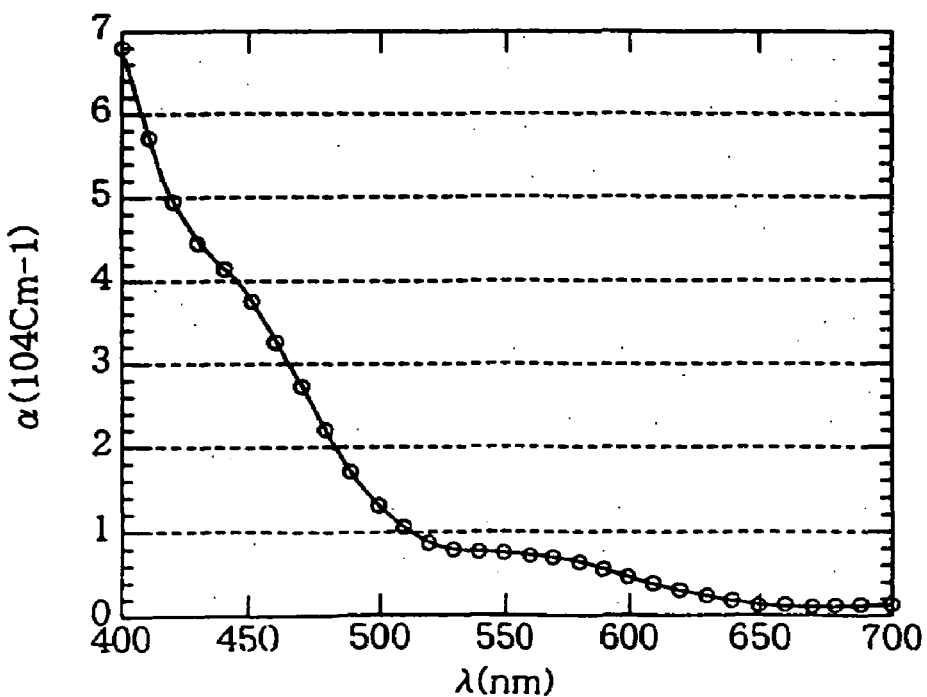

FIG. 21 is a graph showing the dependence of the absorption coefficient of a BiDyGaIG thin layer on the wavelength.

Figure 22:
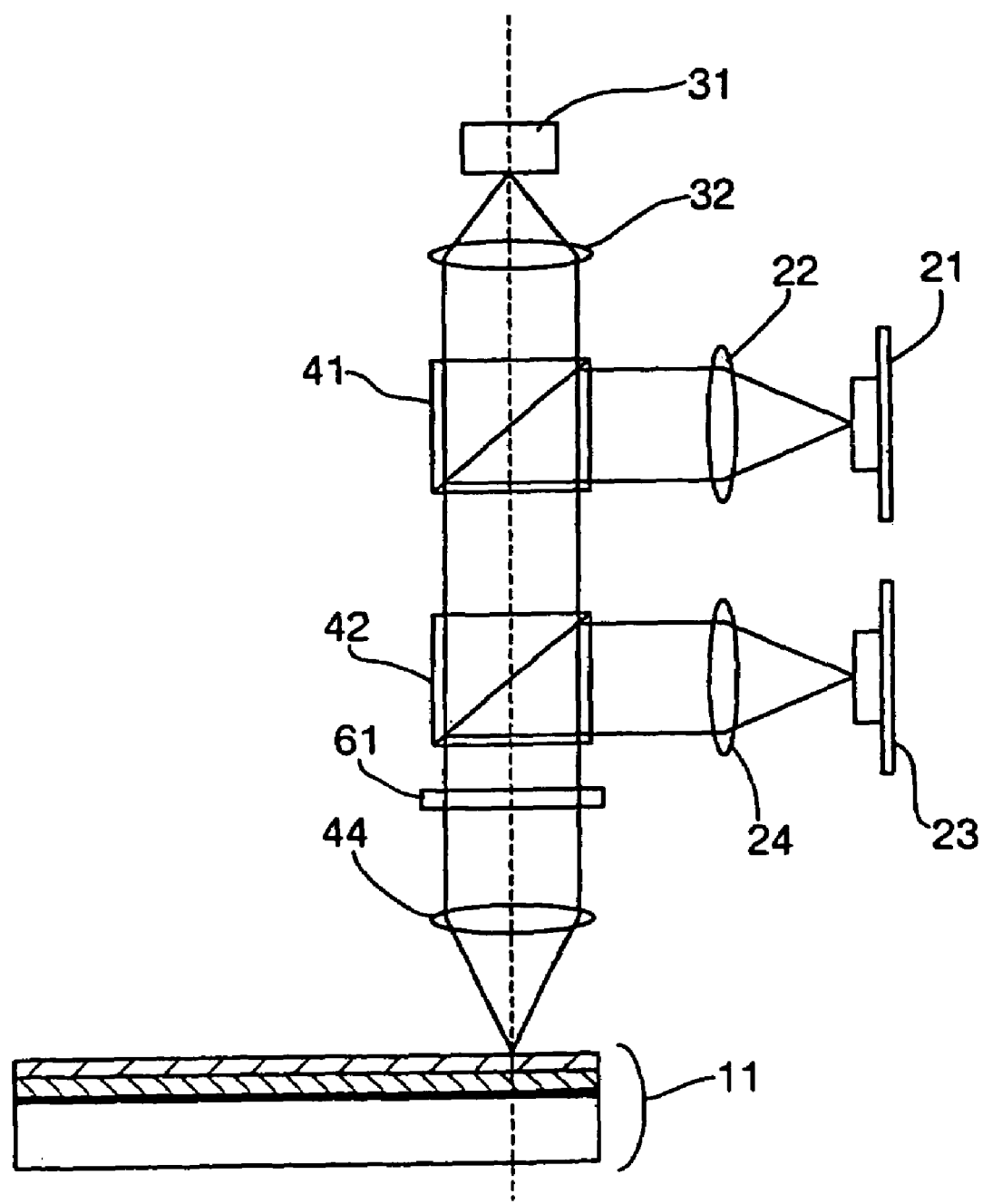

FIG. 22 is a figure showing the optical system outline of an embodiment of the magneto-optical data recording and playback device of the present invention.

Figure 23:
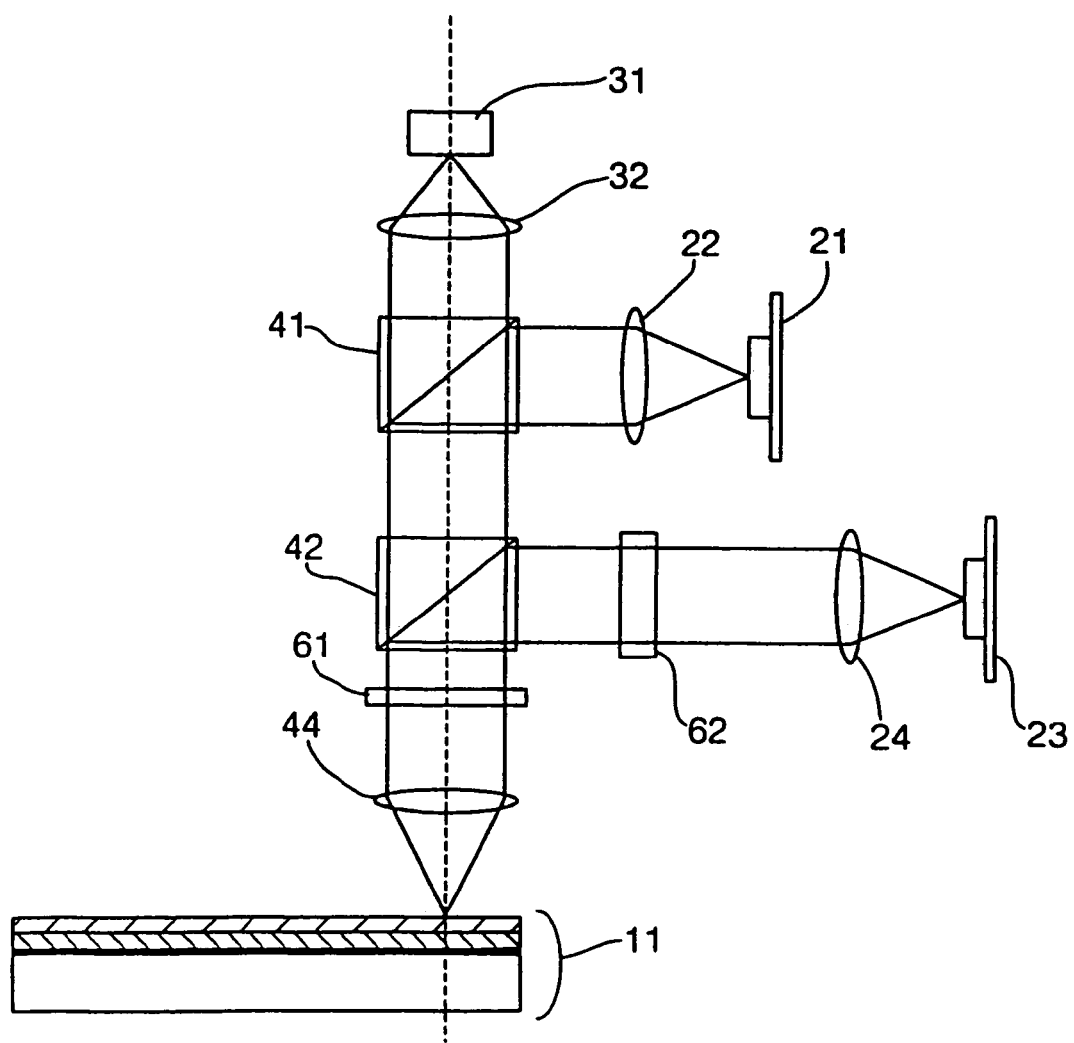

FIG. 23 is a figure showing the optical system outline of another embodiment of the magneto-optical data recording and playback device of the present invention.

Figure 24:
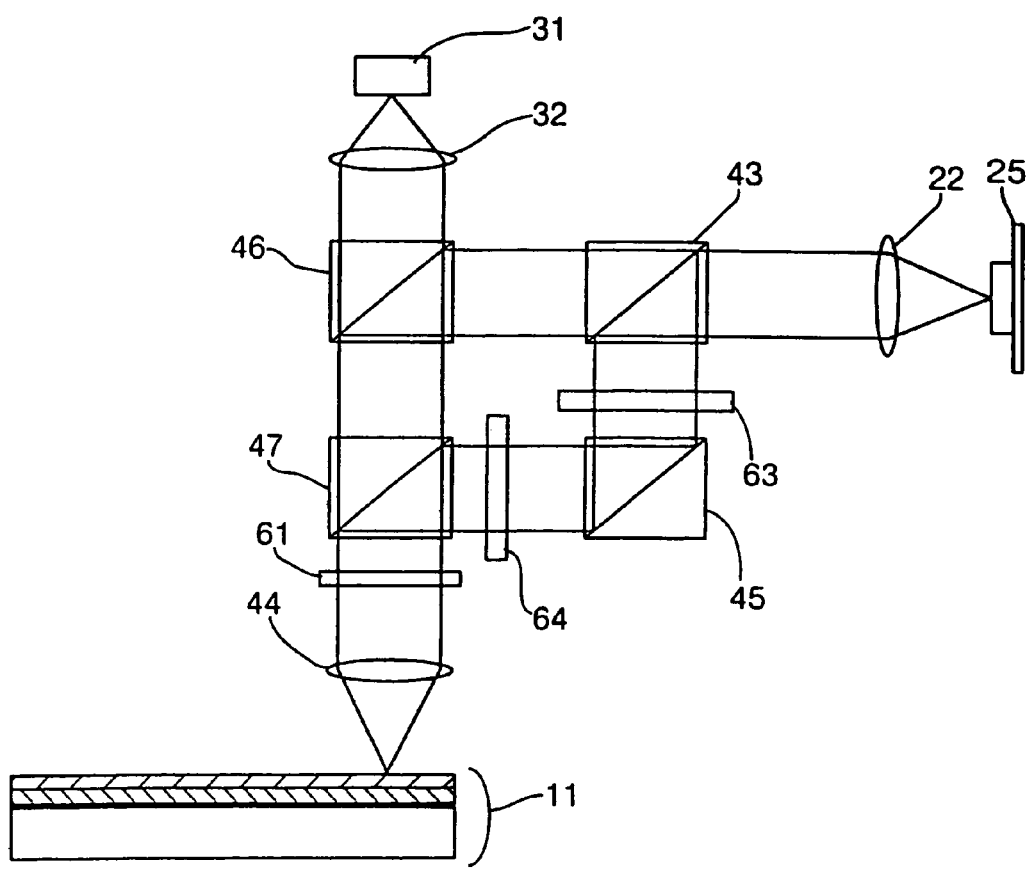

FIG. 24 is a figure showing the optical system outline of another embodiment of the magneto-optical data recording and playback device of the present invention.

DETAILED DESCRIPTION OF THE PREFERRED EMBODIMENTS

Spinel ferrite, which is a kind of ferrite having a spinel type crystal structure, which is known as a material for magneto-optical recording, has a high Faraday rotation effect (Brevet Francais No. 933315258 (1993)). It does not crack and can provide small crystal particles on the order of nanometers, which makes it suitable for high density recording. Nevertheless, there is the problem that sufficient signal output cannot be obtained since the absorption coefficient of the spinel ferrite layer itself is large. However, it is quite easy to form a layer having tensile stress if spinel ferrite is used, since it has a different crystal structure from garnet ferrite.

With regard to rutile-type oxide and hematite which are the same as ferrite in terms of being inorganic oxides, it also easy to form a layer having tensile stress, and minute crystal particles on the order of nanometers can be obtained.

In the recording medium of the present invention, a garnet ferrite layer and any one of a spinel ferrite layer, a rutile-type oxide layer or a hematite layer are layered together so that undesirable compressive stress applied to the garnet ferrite layer can be canceled by the tensile stress of the spinel ferrite, rutile-type oxide and hematite layer.

Accordingly, a recording layer having excellent magnetic properties such as a large square ratio (residual magnetization/saturation magnetization), increased magnetic coercive force and high vertical anisotropy, and having improved morphology can be obtained. Because of this, a high density recording medium suitable for magneto-optical recording can be produced.

In the medium in which a plurality of garnet ferrite layers and a plurality of spinel ferrite layers, rutile-type oxide layers or hematite layers are layered alternately or at random, it is easy to obtain a recording layer having excellent magnetic properties because the internal stress of the recording layer can be controlled over a wide range from compressive stress to tensile stress. Furthermore, the number of heat treatments can be reduced.

As a substrate for the medium, a heat-resistant glass such as quartz glass or Pyrex glass is generally used. In the present invention, ferrite represented by the general formula $R_{x-y}Co_yFe_{3-x}O_4$ ($0 \leq x \leq 1$, $0 \leq y \leq x$, and R is at least one kind of rare earth element including Dy) including $Fe_3O_4$, and $\gamma\text{-}Fe_2O_3$, for example, is used as the spinel ferrite. On the other hand, ferrite represented by the general formula $Bi_xR_{3-x+u}M_yFe_{5-y+v}O_{12}$ ($0 \leq x \leq 3$, $0 \leq y \leq 5$, $-3 \leq u \leq 3$, $-3 \leq v \leq 3$, $-5 \leq x \leq 5$, R is at least one kind of rare earth element including Dy, and M is a tervalent metal being interchangeable with iron) including iron garnet, for instance, is used as the garnet ferrite. Rutile-type oxide is represented by $RO_2$ (R is a transition metal such as Ti and Cr), and $TiO_2$ is generally used. As the hematite, $\alpha\text{-}M_xFe_{2-x}O_3$ ($0 \leq x \leq 1$, M is Ti, V, Cr, Mn, Zr, Nb, Mo and the like) can be used in the present invention. As the material for the reflective layer, a metal such as aluminum, gold, chrome, platinum or alloy thereof can be employed.

If a reflective layer made of a metal material with a thermal expansion coefficient larger than that of glass is formed on a glass substrate in advance by spattering, the reflective layer is subject to tensile stress after the spattering. Therefore, if a recording layer is further layered on the reflective layer, the compressive stress in a garnet ferrite layer can be canceled effectively by producing tensile stress in the reflective layer and in a spinel ferrite, rutile-type oxide or hematite layer.

Furthermore, a garnet ferrite layer formed on a spinel ferrite, rutile-type oxide or hematite layer inherits the morphology afforded by the minute crystal particles, which is the feature of spinel ferrite, rutile-type oxide or hematite, and produces minute garnet ferrite crystals. Therefore, a garnet ferrite layer having minute morphology suitable for high-density recording can be obtained.

Accordingly, a magneto-optical recording medium with high resolution, high recording density and low noise can be produced. Further, it is also possible to produce a magneto-optical recording medium having an excellent S/N ratio because of the synergistic effect of high output effect derived from very large Faraday effect originally provided by the garnet ferrite and the low noise effect.

If a reflective layer is located between a substrate and a recording layer, it is unnecessary to consider passivation and to provide a protective film on the reflective layer, even if the reflective layer is made of metal, since an oxide-type recording layer which is extremely stable over a long time covers the reflective layer. This allows the simplification of the production process of a magneto-optical recording medium and the reduction of production costs. Also, this means that an optical pickup mechanism such as a read head can be set substantially closer to the medium surface during playback since no protective film is present. This makes it possible to obtain a higher S/N ratio.

If grooves are formed or loads are attached to the surface of at least one of the substrate, the reflective layer or the recording layer, the effective refraction index of the surface can be changed from place to place. Therefore, servo control of the recording position on the recording medium is possible by detecting the change in strength of the reflected light from the surface caused by the change of the refraction index thereof.

If a transparent layer is further formed on the surface of the recording layer or the reflective layer, irradiated light tends to be less affected by any scratches or dust on the recording medium. Further, if grooves are formed on the surface of the transparent layer, the grooves can be utilized as guides for the servo control.

It is preferable that the thickness of the garnet ferrite layer in the present invention is from 40 to 400 nm because sufficient magnetic properties cannot be obtained if it is less than 40 nm, and cracks may occur if it is more than 400 nm. On the other hand, it is preferable that the thickness of the spinel ferrite, rutile-type oxide or hematite layer is from 10 to 100 nm because sufficient magnetic properties cannot be obtained if it is less than 10 nm, and coloration of the layer causes deterioration of the S/N ratio if it is more than 100 nm.

In the case in which the recording layer comprises a plurality of garnet ferrite layers and a plurality of spinel ferrite, rutile-type oxide or hematite layers, it is preferable that the thickness of the recording layer is from 100 to 1000 nm because sufficient magnetic properties cannot be obtained if it is less than 100 nm, and the transparency of the recording layer becomes worse if it is more than 1000 nm.

In the present invention, the recording layer can comprise another layer made of material for magnetic recording other than garnet ferrite, spinel ferrite, rutile-type oxide and hematite if necessary. However, it is desirable for the garnet ferrite layer to adjoin the spinel ferrite, rutile-type oxide or hematite layer.

Hereafter, the present inventions will be explained in more detail, referring to the figures.

COMPARATIVE EXAMPLES

For comparison with the present invention, recording media each of which has a recording layer consisting of a single layer made of spinel ferrite, rutile-type oxide, hematite or garnet ferrite, were manufactured.

Figure 1A:
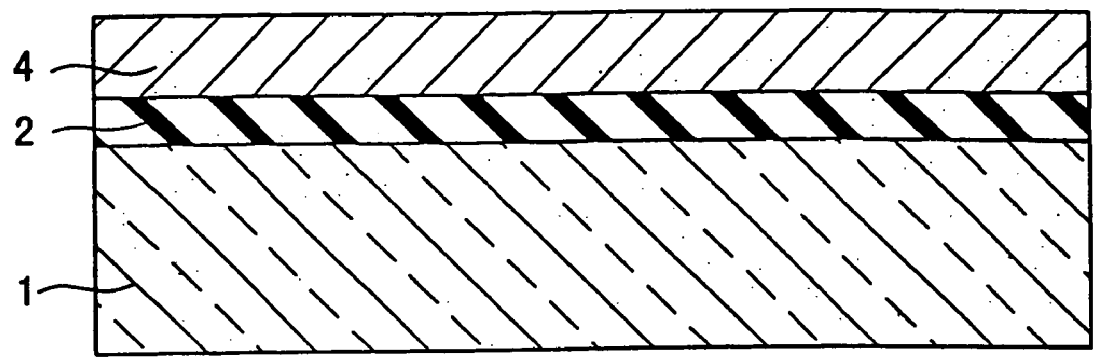
FIG. 1 is a figure showing two types of section structure of a magneto-optical recording medium having a single layer of spinel ferrite, rutile-type oxide or hematite.
Figure 1B:
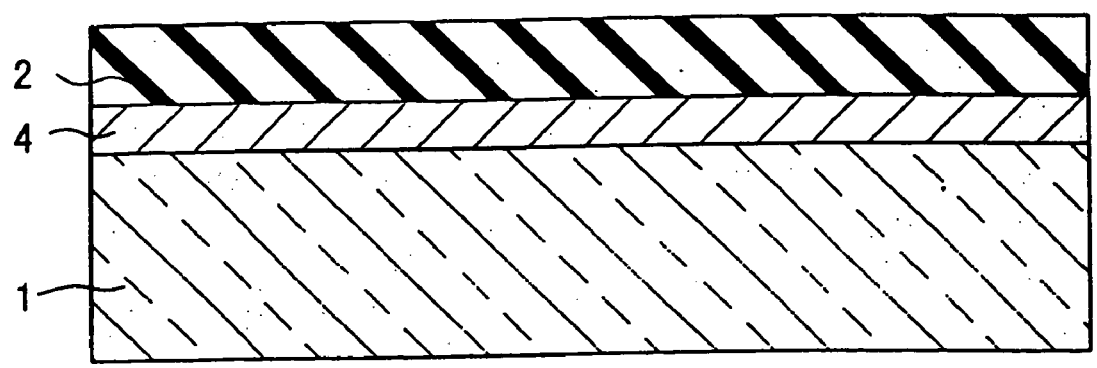

FIG. 1 shows two types of section structure of a magneto-optical recording medium having a recording layer which consists of a single layer of spinel ferrite or rutile ($TiO_2$) (hereunder, referred to as "Comparative Example 1") or of hematite (hereunder, referred to as "Comparative Example 2"). In the case shown in FIG. 1 (a), the spinel ferrite (or rutile) layer 2 on the quartz glass substrate 1 is covered with the metal reflective layer 4. On the other hand, in the case shown in FIG. 1 (b), the layer order of the metal reflective layer 4 and the spinel ferrite (or rutile) layer 2 on the quartz glass substrate 1 is different from that of FIG. 1 (a).

The manufacturing process of the Comparative Example 1 in which spinel ferrite was employed was as follows. First, in the case of FIG. 1 (a), the spinel ferrite layer 2 made from $Mn_{0.13}Co_{0.73}Fe_{2.14}O_4$ and having a thickness of 100 nm was formed on the quartz glass substrate 1 by RF spattering. After that, it was heat-treated in a normal-pressure atmosphere of 20% oxygen and 80% nitrogen for 10 minutes at 400° C., and finally, the spinel ferrite layer 2 was coated with the metal reflective layer 4. According to AFM (Atomic Force Microscope) surface observation, the surface roughness and the crystal particle diameter of the spinel ferrite layer 2 after the heat-treatment were 2 nm and 30 nm at most, respectively, which indicated that the surface of the spinel ferrite layer 2 was very flat.

In the case of FIG. 1 (b), the manufacturing process of the Comparative Example 1 was conducted under the same conditions as the case of FIG. 1 (a) except that the metal reflective layer 4 was formed in advance on the quartz glass substrate 1. According to AFM surface observation, the surface roughness and the crystal particle diameter of the spinel ferrite layer 2 were 2 nm, and 30 nm at most, respectively, which indicated that the surface of the spinel ferrite layer 2 was very flat.

On the other hand, the Comparative Example 1 in which rutile ($TiO_2$) was employed instead of spinel ferrite was manufactured under the same conditions as mentioned above. According to AFM surface observation, the surface roughness and the crystal particle diameter of rutile layers 2 of both FIG. 1 (a) and (b) were 2 nm and 30 nm at most, respectively, which indicated that the surface of the rutile layer 2 was very flat. Comparative Example 2 was manufactured under the same conditions as Comparative Example 1. In Comparative Example 2, $\alpha$-$Fe_2O_3$ was employed as hematite. According to AFM surface observation, the surface roughness and the crystal particle diameter of the hematite layers 2 of the both of FIG. 1 (a) and (b) were 2 nm and 30 nm at most, respectively, which indicated that the surface of the hematite layer 2 was very flat.

Figure 2A:
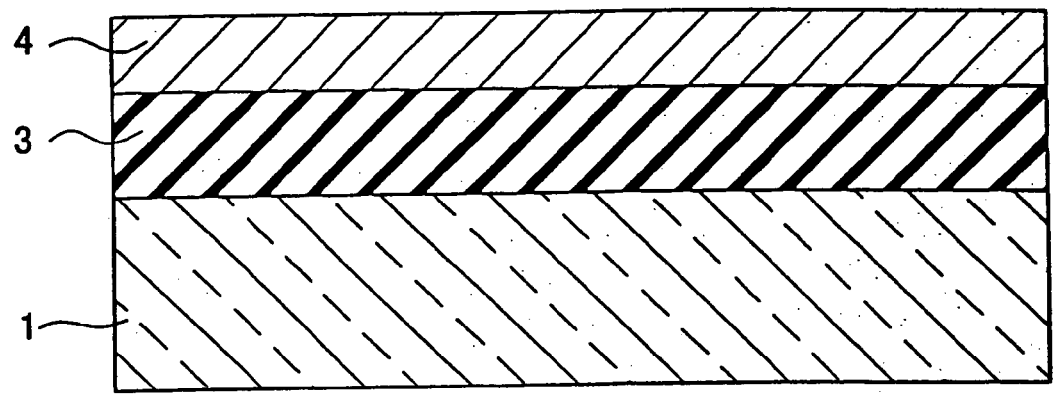
FIG. 2 is a figure showing two types of section structure of a magneto-optical recording medium having a single garnet ferrite layer.
Figure 2B:
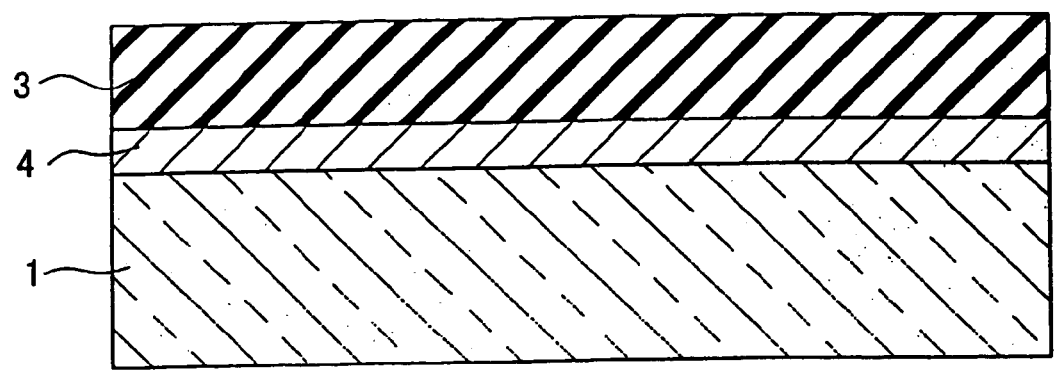

FIG. 2 shows two types of section structure of a magneto-optical recording medium having a recording layer which consists of a single layer of garnet ferrite (hereunder, referred to as "Comparative Example 3"). In the case shown in FIG. 2 (a), the garnet ferrite layer 3 on the quartz glass substrate 1 is covered with the metal reflective layer 4. On the other hand, in the other case shown in FIG. 2 (b), the layer order of the metal reflective layer 4 and the garnet ferrite layer 3 on the quartz glass substrate 1 is different from that of FIG. 2 (a).

The manufacturing process of Comparative Example 3 was as follows. First, in the case of FIG. 2 (a), the garnet ferrite layer 3 made from $Bi_2DyFe_4GaO_{12}$ and having a thickness of 350 nm was formed on the quartz glass substrate 1 by a RF spattering method. After that, it was heat-treated in a normal-pressure atmosphere of 100% oxygen for 10 minutes at 650° C., and finally, the garnet ferrite layer 3 was coated with the metal reflective layer 4. According to AFM surface observation, the surface roughness and the crystal particle diameter of the garnet layer 3 after the heat-treatment were 4 nm and 70 nm, respectively, and cracks of 1 to 3 µm were found on the surface.

For the case of FIG. 2 (b), the manufacturing process of Comparative Example 3 was conducted under the same conditions as the case of FIG. 2 (a) except that the metal reflective layer 4 was formed in advance on the quartz glass substrate 1. According to AFM surface observation, the surface roughness and the crystal particle diameter of the garnet layer 3 were 4 nm, and 70 nm, respectively, and cracks of 1 to 3 µm were found on the surface.

Embodiments 1 and 2

FIG. 3 shows two types of section structure of a magneto-optical recording medium having a recording layer which consists of two layers of garnet ferrite/spinel ferrite (or rutile) (hereunder, referred to as "Embodiment 1") or of two layers of garnet ferrite/hematite (hereunder, referred to as "Embodiment 2"). In the case shown in FIG. 3 (a), the garnet ferrite layer 3 is layered on the spinel ferrite (or rutile or hematite) layer 2 formed on the quartz glass substrate 1, and the garnet ferrite layer 3 is covered with the metal reflective layer 4. On the other hand, the case shown in FIG. 3 (b) is different from the case of FIG. 3 (a) in a point that the spinel ferrite (or rutile or hematite) layer 2 and the garnet ferrite layer 3 are layered on the metal reflective layer 4 formed or the quartz glass substrate 1. Incidentally, recording and playback are executed by irradiation of a laser from the bottom and through the quartz glass substrate 1 in the case of FIG. 3 (a), while they are executed by direct irradiation of laser onto the recording layer from the top in the case of FIG. 3 (b).

The manufacturing process of the Embodiments 1 and 2 was as follows. First, for the case of FIG. 3 (a), the spinel ferrite (or rutile or hematite) layer 2 as an underlayer was formed on the quartz glass substrate 1 by RF spattering, and it was heat-treated under the same conditions as Comparative Examples 1 and 2. After that, the garnet ferrite layer 3 having a large Faraday effect was formed on the spinel ferrite (or rutile or hematite) layer 2 by RF spattering, and it was heat-treated under the same conditions as Comparative Example 3. Finally, the garnet ferrite layer 3 was coated with the metal reflective layer 4. For the case of FIG. 3 (b), the manufacturing process for Embodiment 1 was conducted under the same conditions as mentioned above except that the metal reflective layer 4 was formed in advance on the quartz glass substrate 1.

$Mn_{0.13}Co_{0.73}Fe_{2.14}O_4$, $TiO_2$, $\alpha\text{-}Fe_2O_3$ and $Bi_2DyFe_4GaO_{12}$ were used as spinel ferrite, rutile, hematite and garnet ferrite, respectively. The thickness of the spinel ferrite (or rutile or hematite) layer 2 and the garnet ferrite layer 3 were 100 nm and 350 nm, respectively.

According to AFM surface observation, whichever material was selected from spinel ferrite, rutile or hematite as the underlayer in both structures of FIG. 3 (a) and (b), there were no cracks on the surface of the garnet ferrite layer 3 after heat treatment and the surface roughness, and the crystal particle diameter in this layer were 3 nm and 40 nm at most, respectively, which indicated that the surface of the garnet ferrite layer 3 was very flat. It is apparent from these results that the morphology of the garnet ferrite layer 3 was remarkably improved and minute garnet ferrite crystals could be obtained by use of the spinel ferrite (or rutile or hematite) layer 2 as the underlayer for the garnet ferrite layer 3. The reason for this seems to be inheritance of the morphology produced by the minute crystal particles by the spinel ferrite (or rutile or hematite) layer 2 to the garnet ferrite layer 3. Therefore, a magneto-optical recording medium with high resolution, high recording density and low noise can be produced. Further, it is also possible to produce a magneto-optical recording medium having an excellent S/N ratio because of the synergistic effect of high output effect derived from very large Faraday effect originally produced by the garnet ferrite and the low noise effect.

Further, in the case shown in FIG. 3 (b) where the metal reflective layer 4 is located between the quartz glass substrate 1 and spinel ferrite (or rutile or hematite) 2, no protective means such as a protective film is necessary for the metal reflective layer 4 because passivation does not occur. This allows the simplification of the production process and a reduction of production costs. Also, this means that an optical pickup mechanism such as a read head can be set substantially closer to the medium surface during playback since there is no protective means. This makes it possible to obtain a higher S/N ratio than before.

It is preferable that the thickness of the garnet ferrite layer 3 in Embodiments 1 and 2 is from 40 to 400 nm because sufficient magnetic properties cannot be obtained if it is less than 40 nm, and cracks may occur if it is more than 400 nm. On the other hand, it is preferable that the thickness of the spinel ferrite (or rutile or hematite) layer 2 is from 10 to 100 nm because improvements in the morphology of the surface of the garnet ferrite layer 3 adjacent to the layer 2 may not be obtained if it is less than 10 nm, and coloration of the layer causes deterioration of the S/N ratio if it is more than 100 nm.

Figure 4A:
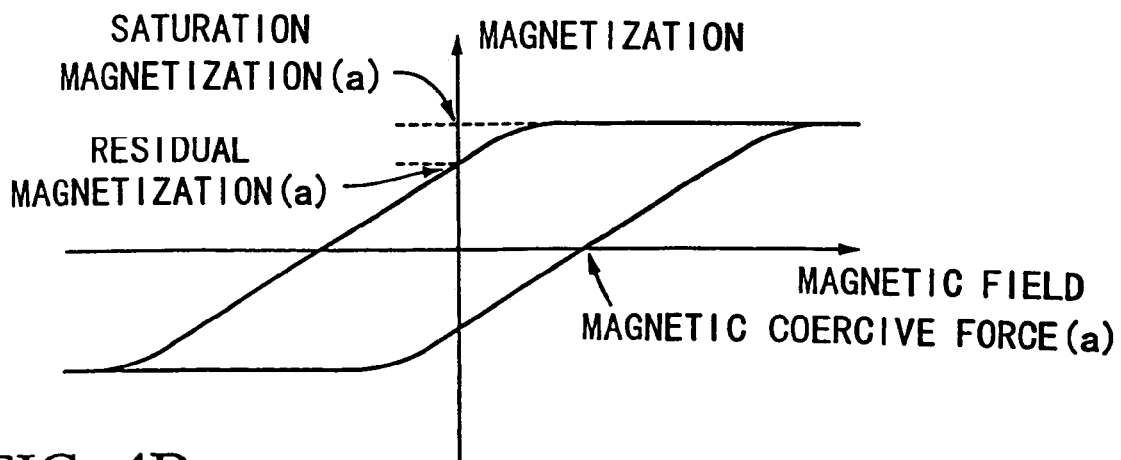
FIG. 4 is a figure showing magnetization curves of magneto-optical recording media that have a single layer of spinel ferrite, a single layer of garnet ferrite and two layers of garnet ferrite/spinel ferrite (or rutile-type oxide).
Figure 4B:
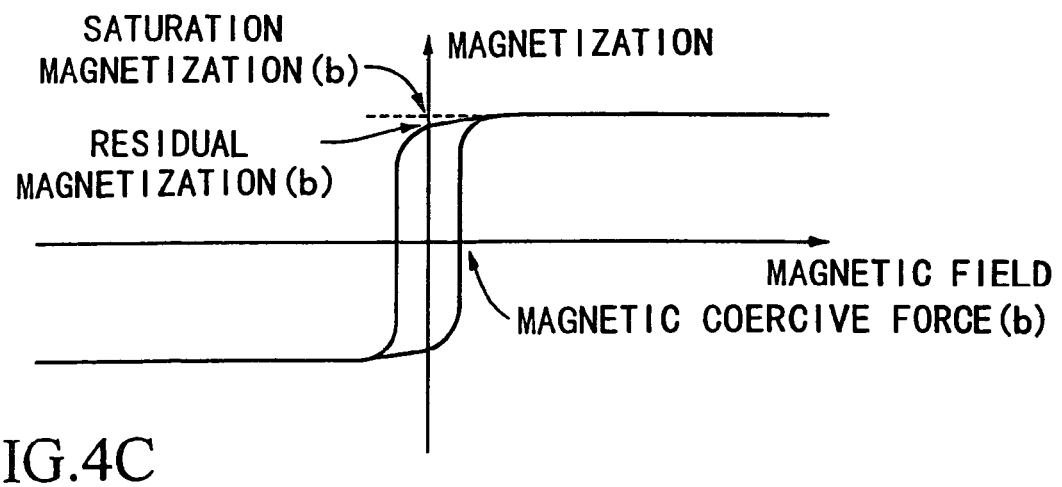
Figure 4C:
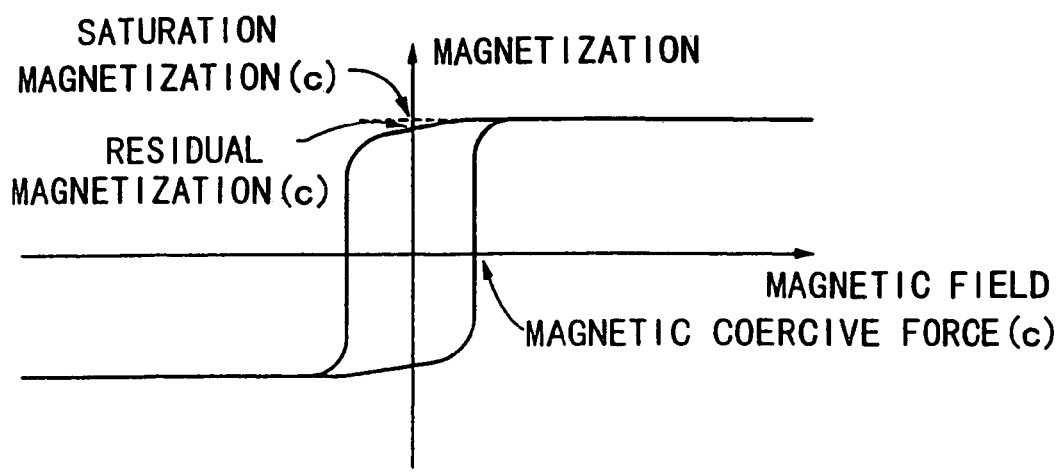

FIG. 4 shows magnetization curves of Comparative Examples 1 and 3, and Embodiment 1. FIGS. 4 (a), (b) and (c) correspond to the magnetization properties of Comparative Example 1 having a single layer of spinel ferrite, Comparative Example 2 having a single layer of garnet ferrite and Embodiment 1 having both layers, respectively.

Comparative Example 1 having a single layer structure of spinel ferrite had the hystetesis shown in FIG. 4 (a), and the magnetic coercive force (a), the saturation magnetization (a) and the residual magnetization (a) were 5000Oe, 250 emu/cc and 150 emu/cc, respectively. Accordingly, Comparative Example 1 has sufficient property for a practical use in terms of the magnetic coercive force (more than 2000Oe). However, practical problems such as deterioration of the S/N ratio can be expected since the square ratio, which was 0.6 (the residual magnetization (a)/saturation magnetization (a)=150/250=0.6), is small. It is said that a square ratio equal to or more than about 0.8 is ideal for practical use.

On the other hand, Comparative Example 3 having a single layer structure of garnet ferrite had the hysteresis shown in FIG. 4 (b), and the magnetic coercive force (b), the saturation magnetization (b) and the residual magnetization (b) were 1200Oe, 13 emu/cc and 10 emu/cc, respectively. Accordingly, Comparative Example 3 has sufficient square ratio for a practical use since it was about 0.8 (10/13). However, practical problems such as an increase in noise during high density recording can be expected since the magnetic coercive force 1200Oe was small (for practical use, a magnetic coercive force of at least 2000Oe is said to be ideal).

Contrary to Comparative Examples 1 and 3, Embodiment 1, having a two-ply structure of garnet ferrite/spinel ferrite (or rutile), had the hysteresis shown in FIG. 4 (c), and the magnetic coercive force (c), saturation magnetization (c) and the residual magnetization (c) were 2000Oe, 13 emu/cc and 10 emu/cc, respectively. Accordingly, Embodiment 1 had sufficient magnetic properties for a practical use in terms of both the magnetic coercive force, and a square ratio of about 0.8 (10/13). In addition, regardless of whether spinel ferrite or rutile was selected as the material of the underlayer for the garnet ferrite layer 3, the values of the above magnetic properties were definitely the same.

As is obvious from the above, the magnetic properties, which were poor in the recording media having a single layer of either garnet ferrite or spinel ferrite (or rutile), were remarkably improved in the recording media having a two-ply structure of garnet ferrite/spinel ferrite (or rutile). Whichever was selected from spinel ferrite or rutile as the material of the underlayer, the S/N ratio of Embodiment 1 actually improved by 20 dB over Comparative Example 3.

Figure 5A:
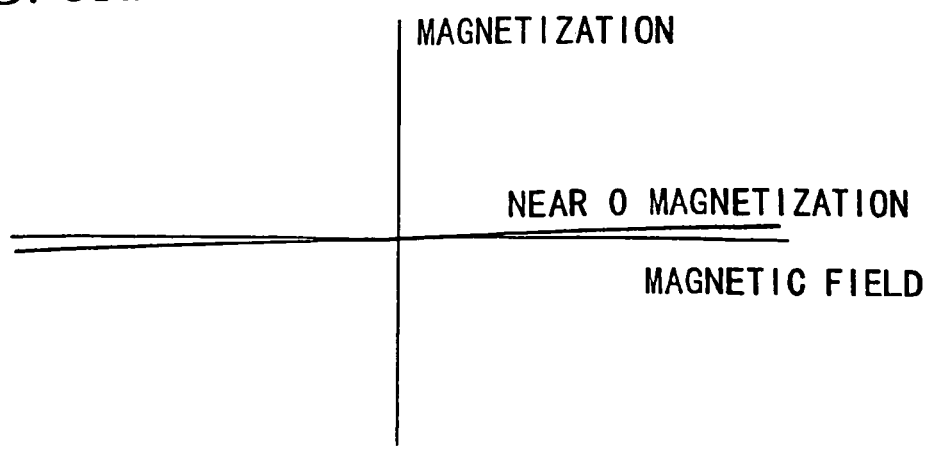
FIG. 5 is a figure showing magnetization curves of magneto-optical recording media that have a single layer of hematite, a single layer of garnet ferrite and two layers of garnet ferrite/hematite.
Figure 5B:
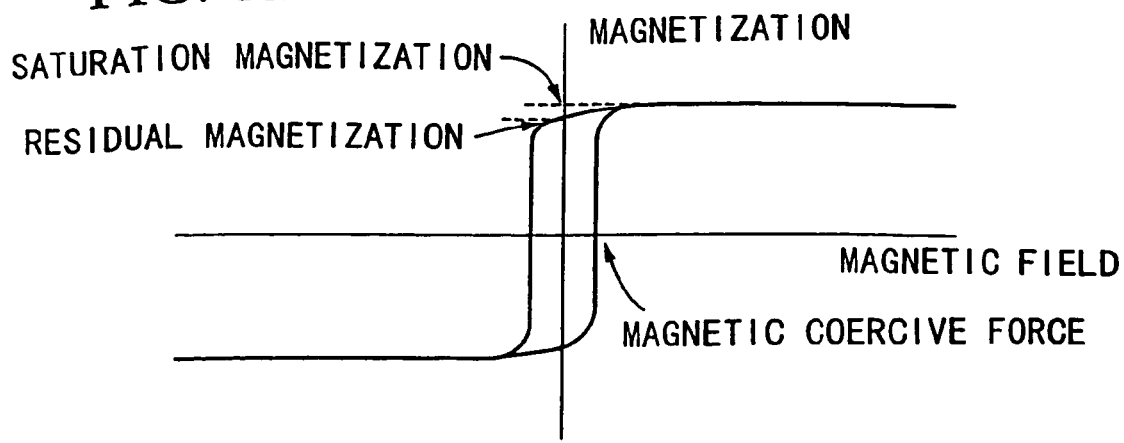
Figure 5C:
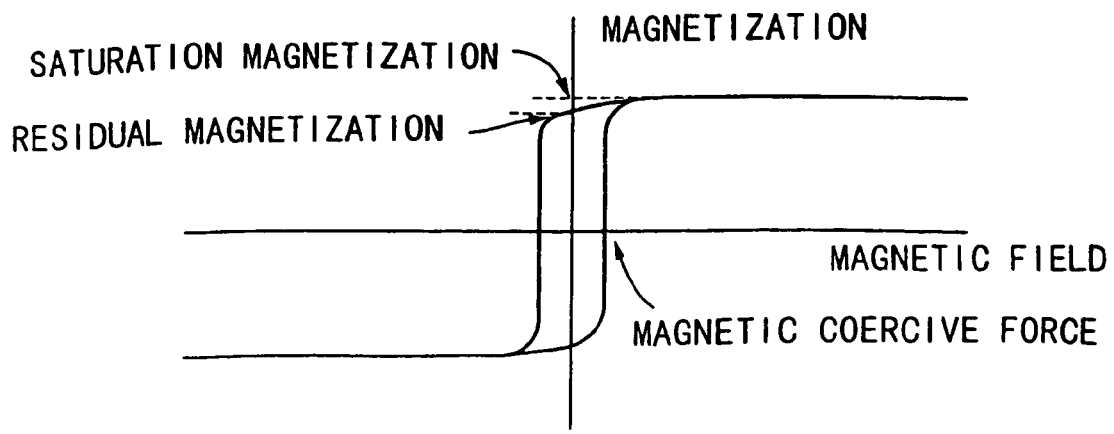

FIG. 5 shows the magnetization curves of Comparative Examples 2 and 3, and Embodiment 2. FIGS. 5 (a), (b) and (c) correspond to the magnetization curve of Comparative Example 2, having a single layer of hematite, Comparative Example 3, having a single layer of garnet ferrite, and Embodiment 2 having both layers, respectively.

As is obvious from FIG. 5 (a), Comparative Example 2, which has a recording layer consisting of a single layer of hematite, is non-magnetic. On the other hand, Comparative Example 3, which has a recording layer consisting of a single layer of garnet ferrite, has the magnetization hysteresis properties shown in FIG. 5 (b). Namely, the magnetic coercive force, the saturation magnetization and the residual magnetization were 1200oe, 13 emu/cc and 10 emu/cc, respectively, as mentioned above. On the other hand, Embodiment 2, having a recording layer which consists of a garnet ferrite layer/hematite layer had the same magnetic coercive force, saturation magnetization and residual magnetization as Comparative Example 3, which is shown in FIG. 5 (c). It was also found that S/N ratio was improved by 5 dB over Comparative Example 3.

According to the magneto-optical recording medium of Embodiment 1, the morphology of the garnet ferrite layer 3 is improved by the effect derived from the spinel ferrite layer 2 as an underlayer. However, the magnetic properties, such as the magnetic coercive force of the medium, change due to the effect of the spinel ferrite (or rutile) layer 2, which is ferromagnetic. According to the magneto-optical recording medium of Embodiment 2, however, the magnetic properties of the garnet ferrite layer 3 do not change because the hematite layer 2 is non-magnetic. Therefore, stabler reading and recording of data is possible in Embodiment 2. Besides, output signal for playback from the magneto-optical recording medium of the embodiment 1 where the spinel ferrite layer 2 is used as an underlayer may decrease because the absorption coefficient of the spinel ferrite layer 2 itself is large. In Embodiment 2, however, no such inconvenience occurs because no spinel ferrite underlayer is used.

Embodiment 3

FIG. 6 shows two types of section structure of a magneto-optical recording medium having a recording layer which consists of multiple layers of garnet ferrite/spinel ferrite (or rutile or hematite) (hereunder, referred to as "Embodiment 3"). In the case shown in FIG. 6 (a), the multiple recording layer 5 consisting of a plurality of garnet ferrite layers and a plurality of spinel ferrite (or rutile or hematite) layers is layered on the quartz glass substrate 1, and it is covered with the metal reflective layer 4. On the other hand, in the case shown in FIG. 6 (b), the layer order of the metal reflective layer 4 and the multiple recording layer 5 is different from that of FIG. 6 (a).

Embodiment 3 was manufactured by the same method used for Embodiments 1 and 2, except that heat treatment for the multiple recording layer 5, which was previously formed by layering a plurality of spinel ferrite (or rutile or hematite) layers and garnet ferrite layers, was performed only once. The layer structure type shown in FIG. 6 (a) and that shown in FIG. 6 (b) correspond to the case shown in FIG. 3 (a) of Embodiment 1 or 2 and the case shown in FIG. 3 (b) of Embodiment 1 or 2, respectively.

According to observation of the magnetic properties of Embodiment 3, when either spinel ferrite or rutile, but not garnet ferrite, was selected as the material of the multiple recording layer 5, it had 2000oe of magnet coercive force, 13 emu/cc of saturation magnetization and 10 emu/cc of residual magnetization, and the square ratio was about 0.8, and these values were the same as those of Embodiment 1. Besides, the surface roughness and the crystal particle diameter of the multiple recording layer 5 after heat-treatment were 3 nm and 40 nm at most, respectively. In other words, Embodiment 3 having a multiple recording layer made from garnet ferrite/spinel ferrite or rutile could provide the same magnetic properties and morphology as Embodiment 1. On the other hand, Embodiment 3, where hematite was used as the material for the multiple recording layer 5 with garnet ferrite, had the same magnet properties and morphology as Embodiment 2.

According to Embodiment 3, the number of heat treatments can be reduced because it is not necessary to heat treat each layer included in the multiple recording layer 5 in order to obtain the same magnetic properties and morphology as Embodiments 1 and 2. Further, a recording layer having excellent magnetic properties can be more easily obtained because internal stress of the recording layer can be precisely controlled.

The thickness of the multi-layered recording layer 5 is preferably between 40 and 1000 nm because sufficient magnetic properties cannot be obtained if it is less than 40 nm and the transparency of the recording layer is degraded if it is more than 1000 nm.

The following embodiments can also be prepared in accordance with substantially the same manufacturing methods employed in Embodiments 1 to 3.

Embodiment 4

FIG. 7 shows two types of section structure of a magneto-optical recording medium having a recording layer which consists of two layers of garnet ferrite/spinel ferrite (or rutile or hematite), and grooves for servo control on its surface (hereunder, referred to as "Embodiment 4"). In the case shown in FIG. 7 (a), the garnet ferrite layer 3 is layered on the spinel ferrite (or rutile or hematite) layer 2 formed on the quartz glass layer 1, and the garnet ferrite layer 3 is covered with the metal reflective layer 4. On the other hand, the case shown in FIG. 7 (b) is different from that of FIG. 7 (a) in that the spinel ferrite (or rutile or hematite) layer 2 is layered on the metal reflective layer 4 formed on the quartz glass substrate 1.

As shown in the Figure, in Embodiment 4, the grooves 6 are formed on the surface of the spinel ferrite (or rutile or hematite) layer 2, the garnet ferrite layer 3 and the metal reflective layer 4 by employing a quartz glass substrate 1 having grooves with a predetermined width and depth on its surface, thereby changing the effective refraction index on the recording medium from place to place. Then, the change of the refraction index causes a change of the reflected light strength from the recording medium. Therefore, servo control of the recording position on the recording medium is possible by detection of the change. Namely, the grooves 6 on the recording medium function as guides for the servo control of the recording position.

If the recording medium is disk shaped, and is mounted and rotated on a rotating means such as an electric or ultrasonic motor, for example, the grooves 6 are formed along the circumferential direction of the medium. On the other hand, if the recording medium is not rotated but is mounted on an linear moving mechanism or cyclic vibrating mechanism such as a linear ultrasonic motor or a laminated piezo device, the grooves 6 are formed along the linear direction or the cyclic vibrating direction thereof. Incidentally, the grooves 6 need not be consecutive and can be a set of non-consecutive pit-shaped patterns.

Embodiment 5

FIG. 8 shows two types of section structure of a magneto-optical recording medium having a recording layer which consists of multiple layers of garnet ferrite/spinel ferrite (or rutile or hematite) and grooves for servo control on the surface (hereunder, referred to as "Embodiment 5"). In the case shown in FIG. 8 (*a*), a multiple recording layer 5 consisting of a plurality of garnet ferrite layers and a plurality of spinel ferrite (or rutile or hematite) layers is layered on the quartz glass substrate 1, and it is covered with the metal reflective layer 4. On the other hand, in the case shown in FIG. 8 (*b*), the layer order of the metal reflective layer 4 and the multiple recording layer 5 is different from that of FIG. 8 (*a*).

In the case shown in FIG. 8 (*a*), a quartz glass substrate 1 having pre-formed grooves is employed. However, the grooves 6 can be formed on the surface of the recording medium by employing a metal reflective layer 4 having grooves with a predetermined width and depth on its surface. In the same way as in Embodiment 4, the grooves 6 can be formed along the circumferential, linear moving or vibrating direction of the recording medium, and they need not be consecutive.

Embodiment 6

FIG. 9 shows two types of section structure of a magneto-optical recording medium having a recording layer which consists of two layers of garnet ferrite/spinel ferrite (or rutile or hematite) and loads for servo control on its surface (hereunder, referred to as "Embodiment 6"). In the case shown in FIG. 9 (*a*), the garnet ferrite layer 3 is layered on the spinel ferrite (or rutile or hematite) layer 2 formed on the quartz glass substrate 1, and the garnet ferrite layer 3 is covered with the metal reflective layer 4. The loads 7 made of aluminum are attached to the surface of the metal reflective layer 4. On the other hand, the case shown in FIG. 9 (*b*) is different from the case of FIG. 9 (*a*) in that the metal reflective layer 4 is formed on the quartz glass substrate 1 and loads 7 made from silicon oxide are attached directly to the recording layer consisting of spinel ferrite (or rutile or hematite) layer 2 and garnet ferrite layer 3. The material of the loads 7 is not limited, therefore, a variety of metal, oxide and dielectric materials can be employed.

As shown in the figure, in Embodiment 6, concavities and convexities are formed on the surface of the recording medium by attaching loads 7 having a predetermined size onto the surface, and the effective refraction index on the surface can be changed. The change of the refraction index causes a chance of the reflection rate of light from the recording medium. Therefore, servo control of the recording position on the recording medium is possible by detection of the change. Namely, the loads 7 on the recording medium function as guides for the servo control of the recording position.

If the magneto-optical recording medium is disk shaped, and is mounted and rotated on a rotating means like an electric or ultrasonic motor, for example, the loads 7 are attached along the circumferential direction of the recording medium. On the other hand, if the recording medium is not rotated but is mounted on a linear moving mechanism or cyclic vibrating mechanism such as a linear ultrasonic motor or a laminated piezo device, the loads 7 are attached along the linear direction or the cyclic vibrating direction thereof. Incidentally, the loads 7 need not be consecutive.

Embodiment 7

FIG. 10 shows two types of section structure of a magneto-optical recording medium having a recording layer which consists of multiple layers of garnet ferrite/spinel ferrite (or rutile or hematite) and loads for servo control on its surface (hereunder, referred to as "Embodiment 7"). In the case shown in FIG. 10 (*a*), the metal reflective layer 4 is layered on the multiple recording layer 5 which consists of a plurality of spinel ferrite (or rutile or hematite) layers and a plurality of garnet ferrite layers, and is formed on the quartz glass layer 1. The loads 7 made from aluminum are attached onto the surface of the metal reflective layer 4. On the other hand, the case shown in FIG. 10 (*b*) is different from that of FIG. 10 (*a*) in that the multiple recording layer 5 is layered on the metal reflective layer 4 formed on the quartz glass substrate 1, and the loads 7 made from silicon oxide are attached directly to the multiple recording layer 5.

In Embodiment 7, the material of the loads 7 is not limited, and a variety of metal, oxide and dielectric materials can be employed. The concavities and convexities formed by the loads 7 can be used as guides for servo control. And, in the same way as in Embodiment 6, the loads 7 may be attached along the circumferential, linear moving or vibrating direction of the recording medium, and they need not be consecutive.

Embodiment 8

Figure 11A:
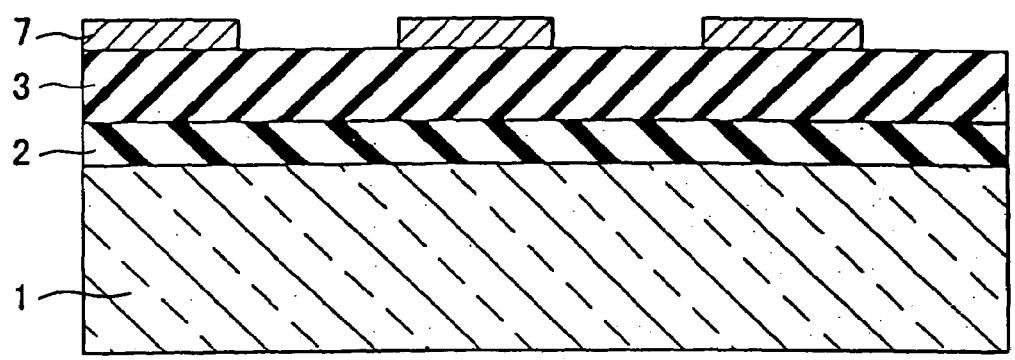
FIG. 11 is a figure showing two types of section structures of magneto-optical recording media having a recording layer which consists of two or multiple layers of garnet ferrite/ spinel ferrite (or rutile-type oxide), and which lacks a metal reflective layer, and on which loads for servo control are attached.
Figure 11B:
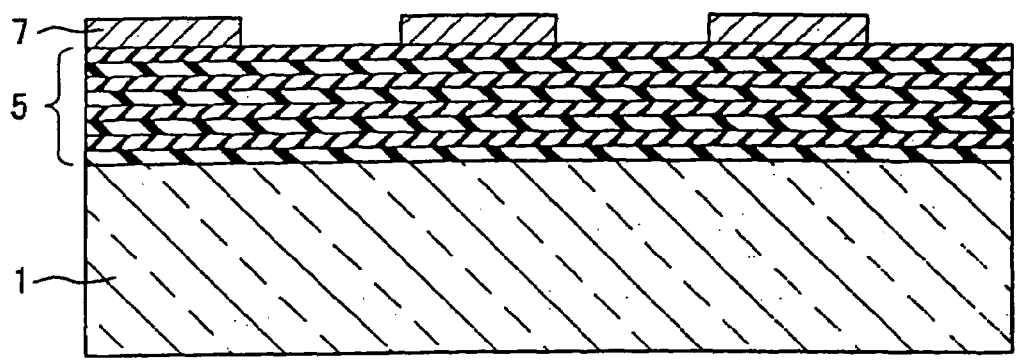

FIG. 11 shows two types of section structures of magneto-optical recording media (hereunder, they are referred to as "Embodiment 8") which lack the metal reflective layer, and in which loads 7 are directly attached to the surface of the recording layer consisting of the garnet ferrite layer 3 and the spilel ferrite (or rutile or hematite) layer 2, or of the multi-layered recording layer 5 consisting of a plurality of garnet ferrite layers and spinel ferrite (or rutile or hematite) layers.

It is apparent from the figure that the loads 7 of appropriate size are directly attached onto the recording layer or the multi-layered recording layer 5 with a predetermined space between each other. The loads 7 in Embodiment 8 are made of a ferromagnetic and anisotropic material such as CoCr alloy (50000e of magnetic coercive force and 300 emu/cc of saturation magnetization) which can be useful as a magnetic recording layer. And, they also have the function of a metal reflective layer because they are made from a metal material. Therefore, in Embodiment 8, the formation of a metal reflective layer can be omitted, maintaining the servo controlability of the recording medium. Further, data recording by using not only a light beam but also a magnetic field is possible. Furthermore, the loads 7 have no substantial effect on the magnetic properties of the garnet ferrite layer in the recording layer or the multi-layered recording layer 5 because the loads 7 are disposed on the surfaces of the recording layer with a predetermined space.

Embodiment 9

FIGS. 12 (*a*) and (*b*) show section structures of magneto-optical recording media (hereunder, they are referred to as "Embodiment 9") which correspond to the types shown in the FIGS. 3 (*b*) and 6 (*b*), respectively, covered with a transparent layer. In Embodiment 9, polycarbonate is used as the material of the transparent layer 8, however, it can be made of other transparent materials if necessary. A proper thickness of the transparent layer 8 is in the range of 100 nm to 2 mm.

As is apparent from the figure, compatibility with conventional media surfaces can be obtained, and the distance between the surface of the recording medium and a recording layer, on which recording is done, in the medium can be extended by providing the transparent layer 8 on the recording layer. Therefore, the laser irradiated by the playback head and focused on the recording layer is less likely to be affected by dust that may be adhering to the surface of the recording medium or by scratches that may be present thereon.

If the optical thickness of the transparent layer 8 is sufficiently shorter than the wavelength of the light used for magneto-optical recording, for example 700 nm or less, Embodiment 9 can be used as a magneto-optical recording medium for near-field recording. This recording method utilizes evanescent light that exists in the proximity of the surface of recording medium surface, typically in the region of one wavelength distance from the surface of the recording medium. On the other hand, if the optical thickness of the transparent layer 8 is equivalent to or more than the wavelength of the light, Embodiment 9 can be used as a magneto-optical recording medium for conventional far field magneto-optical systems such as those including a general condensing lens.

Embodiment 10

FIGS. 13 (*a*) and (*b*) show section structures of magneto-optical recording media (hereunder, they are referred to as "Embodiment 10") which correspond to the types shown in FIGS. 7 (*b*) and 8 (*b*), respectively, further covered with a transparent layer. According to Embodiment 10, it is possible to cause a change of the effective refraction and reflection rates internally in the recording medium because the recording layer having grooves for servo control is covered with the transparent layer 8 as shown in the figure. Accordingly, more accurate control can be performed because external influence is excluded when detecting the change of the reflection rate at an internal part of the recording medium.

Besides, in Embodiment 10, the laser irradiated by the playback head is less likely to be affected by dust that may be adhering to the surface of the recording medium or by scratches that may be present thereupon because the laser is focused on the recording layer inside of the recording medium. The grooves on the recording layer are formed along the circumferential, linear moving or vibrating direction of the recording medium. Incidentally, the grooves need not be consecutive.

Embodiment 11

FIG. 14 shows section structures of magneto-optical recording media (hereunder, they are referred to as "Embodiment 11") which correspond to Embodiment 10, but flattening is carried out for transparent layer 8. In the case of FIG. 14 (*b*), a quartz glass substrate 1 having grooves on its surface is employed. Flattening makes it possible, in addition to the effects of Embodiment 10, for an optical pickup mechanism to fly in the proximity of the surface of the recording medium rotating at high speed in order to record and reproduce data. For example, access to the proximity of the recording medium is performed by mounting the optical pickup mechanism on an air-bearing slider head that is generally used in conventional magnetic recording disk drives.

Embodiment 12

FIGS. 15 (*a*) and (*b*) show section structures of magneto-optical recording media (hereunder, they are referred to as "Embodiment 12") which correspond to the types shown in FIGS. 9 (*b*) and 10 (*b*), respectively, further covered with a transparent layer. Embodiment 12 has the same effects as Embodiment 11. Further, it is the same as Embodiment 6 in that the loads 7 are attached along the circumferential, linear moving or vibrating direction of the recording medium, and they need not be consecutive.

Embodiment 13

FIGS. 16 (*a*) and (*b*) show section structures of magneto-optical recording media (hereunder, they are referred to as "Embodiment 13") which correspond to the types shown in FIGS. 12 (*a*) and (*b*), respectively, and the grooves 6 are formed on the surface of the transparent layer 8. Thereby, servo control of recording position is possible by detecting the change of the effective refraction index on the transparent layer 8. And, compatibility with conventional media surfaces can be obtained, and the distance between the surface of the recording medium and the recording layer, on which recording is done, can be extended by providing the transparent layer 8 on the recording layer. This makes it less likely for the laser irradiated by the playback head and focused on the recording layer to be affected by dust that may be adhering to the surface of the recording medium or by the scratches that may be present thereon. The grooves 6 on the surface of the recording layer 8 are formed along the circumferential, linear moving or vibrating direction of the recording medium. Incidentally, the grooves 6 need not be consecutive.

Hereafter, other magneto-optical recording media which have different layer structures from those mentioned above will be explained.

With regard to the magneto-optical recording media of Embodiments 1-13, there is the concern that sufficient S/N ratio may not be obtained because of increased noise that is derived from the magnetization of a part of the recording layer other than track parts, on which data are recorded, by annealing in the manufacturing process.

Therefore, in the magneto-optical recording medium of the present invention which is described hereafter, the recording layer has a structure in which a garnet ferrite layer is present on the surface of a spinel ferrite layer, a rutile type oxide layer or a hematite layer, which are formed only along track parts on which data are recorded.

FIG. 17 shows a cross section of one embodiment (hereunder, referred to as "Embodiment 14") of a magneto-optical recording medium of the present invention that has a recording layer in which the spinel ferrite layers 2 are formed only along the track parts. In Embodiment 14, the recording layer is constructed by forming the garnet ferrite layer 3 so as to cover the spinel ferrite layers 2 formed along track parts which are parallel with a predetermined space on the substrate 1 made of quartz glass. The garnet ferrite layers 3*a* having magneto-optical property are present on the spinel ferrite layers 2. On the other hand, the non-magnetic garnet ferrite layers 3*b* are present between the spinel ferrite layers 2.

The manufacturing process of Embodiment 14 was as follows. First, a spinel ferrite layer was formed as an underlayer on the substrate 1 by a spattering method and heat treatment was carried out. As the material of the spinel ferrite layer, $R_{x-y}Co_yFe_{3-x}O_4$ ($0 \leq x \leq 1$, $0 \leq y \leq x$, R is at least one element of the rare earth elements including Dy) can be used in the present invention. In Embodiment 14, $Mn_{0.13}CO_{0.73}Fe_{2.14}O_4$ was employed. In more detail, the spinel ferrite layer was formed by RF spattering until the thickness of the layer reached 100 nm in Embodiment 14. After that, it was heat-treated at atmospheric pressure in an atmosphere of 20% oxygen and 80% of nitrogen for 10 minutes at 400° C.

Next, photoresist was applied onto the spinel ferrite layer and the part of the spinel ferrite layer which did not form track parts was removed by inverse spattering after exposing the photoresist to light. After removing the photoresist layer from the surface of the spinel ferrite layer 2 on the tracks, the garnet ferrite layer 3, which has a large Faraday Effect, was formed so as to cover the spinel ferrite layer 2 by RF spattering, and heat treatment was carried out. As the material of the garnet ferrite layer 3, $Bi_xR_{3-x+u}M_yFe_{5-y+v}O_{12}$ ($0 \leq x \leq 3$, $0 \leq y \leq 5$, $-3 \leq u \leq 3$, $-3 \leq v \leq 3$, R is at least one rare earth element including Dy, and M is a tervalent metal being interchangeable with iron) can be used in the present invention. In Embodiment 14, $Bi_2DyFe_4GaO_{12}$ was employed. In more detail, the garnet ferrite layer 3 was formed by RF spattering until the thickness of the layer reached 350 nm in Embodiment 14. After that, it was heat-treated at atmospheric pressure in an atmosphere of 100% oxygen for 10 minutes at 630° C.

The formation of the garnet ferrite layer 3 by spattering or the like so as to cover the spinel ferrite layer 2 formed only along the track parts on the substrate 1 and the heat treatment gave magneto-optical properties only to the garnet ferrite layers 3a on the spinel ferrite layers 2, and made the garnet ferrite layers 3b between the spinel ferrite layers 2 non-magnetic, for the reason described below.

According to the result of AFM surface observation, there were no cracks on the surface of the garnet ferrite layer 3 of Embodiment 14. Further, the surface roughness and the crystal particle diameter of the garnet ferrite layer 3 were 3 nm and 40 nm, respectively, which indicated that the surface of the layer was very flat. Namely, the morphology of the garnet ferrite layer 3 was remarkably improved by the use of the spinel ferrite layers 2 as underlayers of the garnet ferrite layer 3.

Incidentally, rutile type oxide layers or hematite layers can also be employed instead of the spinel ferrite layers 2, and the magneto-optical recording medium corresponding to the embodiment 14 can be manufactured by using those layers and conditions mentioned above.

By the way, as explained before, garnet ferrite layers formed by spattering and heat treatment are generally subject to compression stress. However, spinel ferrite layers, rutile type oxide layers and hematite layers, after the same manufacturing process, are usually subject to tensile stress. In Embodiment 14, therefore, the compressive stress applied to the garnet ferrite layer 3 can be canceled by the tensile stress applied to the spinel ferrite layer 2. Accordingly, a recording layer having large square ratio (residual magnetization/saturation magnetization) can be easily obtained, and a magneto-optical recording medium suitable for high density recording can be produced.

In Embodiment 14, only the garnet ferrite layers 3a exhibit a magnet-optical effect, but the garnet ferrite layers 3b between the spinel ferrite layers 2, namely between the tracks, do not exhibit a magnet-optical effect. Therefore, the noise of the magneto-optical recording medium can be reduced considerably. For example, it was found that noise was reduced by 3 dB in the case in which the width of track was set to be half the pitch of the tracks. Further, recording marks on the recording layer remain stable if fluctuation of the power of the radiated light beam is large, because the width of the recording mark on which data is recorded is physically limited by the width of the track.

Incidentally, the same effects as mentioned above can be obtained if rutile type oxide layers or hematite layers are employed instead of the spinel ferrite layers 2.

It is preferable that the thickness of the spinel ferrite layer 2 (or rutile type oxide layer, or hematite layer) and the garnet ferrite layer 3 in Embodiment 14 are from 10-100 nm and from 40-400 nm, respectively. If the thickness of the spinel ferrite layer 2 (or rutile type oxide layer, or hematite layer) is less than 10 nm, it may be difficult to improve the morphology of the garnet ferrite layer 3 adjacent to the layer. And, if the thickness of the spinel ferrite layer 2 (or rutile type oxide layer, or hematite layer) is more than 100 nm, coloration of the layer, which will cause deterioration of the S/N ratio, may occur. On the other hand, if the thickness of the garnet ferrite layer 3 is less than 40 nm, sufficient magnetic properties may not be obtained. And, if the thickness of the garnet ferrite layer 3 is more than 400 nm, cracks may occur on the surface.

In order to further improve the efficiency of recording and reading, the garnet ferrite layer 3 may be coated preferably with a metal reflective layer 4, which is made from a metal such as aluminum, gold, chrome and alloy thereof, directly or via a dielectric layer 10 as shown in FIGS. 18 (a) and (b).

FIG. 19 shows the X-ray diffraction intensity of the magneto-optical recording medium having a recording layer which consists of a single layer of garnet ferrite, and one having a recording layer which consists of two layers of spinel ferrite and garnet ferrite. This figure also shows the relation between the X-ray diffraction intensity of the magneto-optical recording media and the temperature of the heat treatment applied to the garnet ferrite layer in the manufacturing process. The garnet ferrite layer and/or the spinel ferrite layer in each magneto-optical recording medium were formed under the same conditions as Embodiment 14 except that the temperature of the heat treatment was variously changed.

The X-ray diffraction intensity shown in FIG. 19 was obtained by measuring the peak strength of the diffraction angle ($2\theta=32°$) during the radiation of X-rays ($K\alpha$) onto the above magneto-optical recording media. This diffraction angle can act as an indicator showing the crystal state of the garnet ferrite layer.

It is apparent from FIG. 19 that a practical magneto-optical effect appears if the temperature of the heat treatment is over about 650° C. in the case in which the recording layer consists of a single layer of garnet ferrite. From the viewpoint of crystallization of the above case, crystallization of the garnet ferrite layer began at about 600° C., and the crystallization conditions that make magneto-optical recording possible are obtained at about 650° C. On the other hand, in the case in which the recording layer consists of two layers of garnet ferrite and spinel ferrite, a practical magneto-optical effect already appears when the temperature of the heat treatment exceeds about 570° C. From the viewpoint of crystallization of this case, crystallization of the garnet ferrite layer already begins at about 500° C., and the crystallization conditions that make magneto-optical recording possible are obtained at about 570° C.

It is obvious from these facts that the crystallization conditions which exhibit sufficient magneto-optical properties for a recording layer of a magneto-optical recording medium can be obtained at a lower heat treatment temperature by a combination of a garnet ferrite layer and a spinel ferrite layer. In the magneto-optical recording media shown in FIGS. 17 and 18, therefore, it is possible to provide magneto-optical properties only to the garnet ferrite layers 3a on the spinel ferrite layers 2, and is possible to make the garnet ferrite layers 3b which are not formed on the spinel ferrite layers 2 non-magnetic. In fact, in the manufacturing process of Embodiment 14, the temperature of heat treatment was set at 630° C., whereby magneto-optical properties were provided only to the garnet ferrite layers 3a on the spinel ferrite layers 2.

Incidentally, it was found that temperatures over 700° C., were not appropriate for heat treatment because the peak strength did not increase even if the temperature was raised over 700° C., and deterioration of the magnetic properties was sometimes observed at such temperatures. Therefore, heat treatment for the track parts should be preferably executed at temperatures of 500 to 700° C. Further, it is more preferable to execute heat treatment at temperatures of 600 to 630° C. in order to provide a strong contrast in magneto-optical properties between the garnet ferrite layer on the track parts and that on other parts. Namely, if heat treatment is carried out in the range of 600 to 630° C. in the manufacturing process of Embodiment 14, only the track parts on which the garnet ferrite layer 3 and the spinel ferrite layer 2 are present can have practical magneto-optical properties, which is apparent from FIG. 19. Incidentally, magneto-optical recording media of the present invention which have the same structure of the recording layer as Embodiment 14 provide more options for the material of the substrate 1 because the temperature of heat treatment can be lower than the case in which the recording layer consists of a single layer of garnet ferrite.

The measurement of the magnet properties of the two magneto-optical recording media used in the analysis in FIG. 19 revealed that the magneto-optical recording medium which had a recording layer consisting of a single layer of garnet ferrite had 1200Oe of magnetic coercive force, 13 emu/cc of saturation magnetization and 10 emu/cc of residual magnetization. Accordingly, this medium had sufficient square ratio for a practical use since it was about 0.8 (10/13). However, problems such as increased noise during high density recording can be expected since the magnetic coercive force was small, i.e., 1200Oe (for a practical use, a magnetic coercive force of at least 2000Oe is said to be ideal).

Unlike to the above medium, the medium which had a recording layer in which a spinel ferrite layer and a garnet ferrite layer were piled together had 2000Oe of magnetic coercive force, 13 emu/cc of saturation magnetization and 10 emu/cc of residual magnetization. Accordingly, this medium had sufficient magnetic properties for a practical use in terms of both the magnetic coercive force and the square ratio which was about 0.8 (10/13). In addition, the S/N ratio was improved by 3 dB over the magneto-optical recording medium having a recording layer consisting of a single layer of garnet ferrite. From these data, it was found that the magneto-optical properties of the magneto-optical recording medium was remarkably improved by constructing a multi-layered structure in which a spinel ferrite layer and a garnet ferrite layer were piled together only on the track parts of the recording layer.

In Embodiment 14, the garnet ferrite layer 3 was formed after the track parts were formed by the spinel ferrite layer 2 on the substrate 1. However, it is possible in the present invention to first form the garnet ferrite layer 3 directly on the substrate 1, and to further form the spinel ferrite layer 2 along the track parts on the garnet ferrite layer 3. Incidentally, in the present invention, unrewritable data may be recorded in advance by formation of recording marks in the track parts by patterning in accordance with predetermined data.

Further, the recording layer of the present invention can be constituted by a plurality of garnet ferrite layers and a plurality of spinel ferrite layers (or rutile-type oxide layers or hematite layers), while the recording layer in Embodiment 11 consists of one spinel ferrite layer 2 and one garnet ferrite layer 3. In such a case, it is preferable that the thickness of the recording layer is from 40 to 1000 nm because sufficient magnetic properties cannot be obtained if it is less than 40 nm, and the transparency of the recording layer becomes worse if it is more than 1000 nm.

Furthermore, a transparent layer may be formed on the garnet ferrite layer 3 of Embodiment 14. In the same way as in Embodiment 9, polycarbonate can be used as the material of the transparent layer, the thickness of the transparent layer is preferably in the range of 100 nm to 2 mm, compatibility with a conventional medium surface can be obtained and a light beam focused on the recording layer is less likely to be affected by dust that may be adhering to the surface of the recording medium or by scratches that may be present thereon. Incidentally, grooves for servo control of the recording position may be formed on the surface of the transparent layer.

Incidentally, the recording layer of the magneto-optical recording medium of the present invention can contain other layers made from materials other than garnet ferrite, spinel ferrite, rutile type oxide and hematite for adaptation to various purposes, while the recording layers of Embodiments 1 to 14 consist of garnet ferrite, spinel ferrite, rutile type oxide and/or hematite.

Next, the magneto-optical data recording and playback device of the present invention, which is preferable for recording and playing back data for the magneto-optical recording media of the present invention which were mentioned above, will be described.

FIG. 20 is a graph showing the dependence of the Faraday rotation angle of magneto-optical recording media having various recording layers on the wavelength ($\lambda$) of light. The solid line (1) in FIG. 20 shows the dependence of the Faraday rotation angle of a magneto-optical recording medium having a recording layer consisting of a single layer of BiDyGaIG, which is a kind of garnet ferrite, on the wavelength of light under a magnetic field of 10 kOe. The alternating long and short dash of line (2) of the same Figure shows the dependence of the Faraday rotation angle of a magneto-optical recording medium having a recording layer consisting of a single layer of $Mn_{0.13}Co_{0.73}Fe_{2.14}O_4$, which is a kind of spinel ferrite, on the wavelength of light under a magnetic field of 10 kOe. And, the dotted line (3) shows the dependence of the Faraday rotation angle of the magnet-recording medium shown in FIG. 3 (a), which is "Embodiment 1" having a recording layer of a garnet ferrite layer and a spinel ferrite layer, on the wavelength of light under the same magnetic field. It was found that the magneto-optical properties of the magneto-optical recording medium of Embodiment 1 seemed to be dependent on the garnet ferrite constituting the recording layer, and that a very large playback signal would be gained from the magneto-optical recording medium of Embodiment 1 in the range of visible light.

Next, the dependence of the absorption coefficient ($\alpha$) of a BiDyGaIG thin layer on the wavelength ($\lambda$) of light is shown in FIG. 21. The amorphous metal used in a conventional magnetic-optical recording medium such as TbFeCo does not show any change of absorption character over the range of visible right. However, it was found that the shorter the wavelength of light, the bigger the light absorption coefficient of the BiDyGaIG thin layer became, from FIG. 21. Namely, light absorption increased for wavelengths shorter than near 500 nm but decreased for wavelength longer than near 500 nm. For example, it is obvious from FIG. 21 that the absorption coefficient for light with a wavelength of 410 nm is ten times as high as that for light with a wavelength of 630 nm. The magneto-optical recording medium of Embodiment 1 has the same dependence of absorption coefficient on wavelength as shown in FIG. 21, because the magneto-optical property of the medium of Embodiment 1 is mainly dependent on the garnet ferrite thin layer 3 in the recording layer.

In the magneto-optical recording and playback device of the present invention, the wavelength of light is different for recording and for reading in order to make maximum use of the light absorption properties of the magneto-optical recording medium to be used for recording and reading. If a magneto-optical recording medium having a recording layer containing a layer which has the property shown in FIG. 21 is used for recording and reading data, for example, a light beam with a short wavelength, which is easily absorbed, will be radiated on the medium when recording. On the other hand, in the above case, a light beam with a long wavelength, which is less strongly absorbed than the above light, will be radiated onto the medium when reading. Thereby, it will be possible to heat the recording layer efficiently when recording, and to restrain undesirable heating of the recording layer during playback.

Further, in the above case, the power of the light beam with short wavelength for recording can be reduced compared to a conventional device, because the light beam for recording is efficiently absorbed by the recording layer. On the other hand, the power of the light beam for reading will be increased compared to a conventional device, because a light beam with a long wavelength is scarcely absorbed and well reflected. Therefore, it will be possible to increase the C(career)/N(noise) ratio during playback.

FIG. 22 shows an optical system outline of one embodiment (hereunder, referred to as "Embodiment 15") of a magneto-optical recording and playback device of the present invention. Hereunder, the recording and reading method of Embodiment 15 will be explained referring to FIG. 22.

In Embodiment 15, the disk-shaped magneto-optical recording medium 11 is supported on a rotator, not shown in the figure, to be rotated. The light beam emitted from the light source for recording 21 is focused on the magneto-optical recording medium 11 through the first collimator lens 22, the first beam splitter 41 and the objective lens 44 in sequence when data are recorded on the magneto-optical recording medium 11. The micro area on the recording layer of the magneto-optical recording medium 11, to which the light beam is radiated, is heated by absorption of the light beam, whereby, data are recorded.

On the other hand, when data are read from the magneto-optical recording medium 11, the light beam emitted from the light source for reading 23 is focused on the magneto-optical recording medium 11 through the second collimator lens 22, second beam splitter 42 and the objective lens 44 in sequence. After that, most part of the light beam is reflected off the magneto-optical recording medium 11. The reflected light beam is focused on the light detector 31 through the objective lens 44, the $\lambda/4$ plate 61 and the focusing lens 32 in sequence. At the light detector 31, recording signals are detected. In Embodiment 15, two semiconductor lasers are used as the light source for recording 21 and for reading 23. However, other kinds of laser can be used as the light source as long as they do not interfere with the action of the recording and playback device.

As the magneto-optical recording medium 11 in embodiment 15, any kind of medium can be used. Preferably, a magneto-optical recording medium having a garnet ferrite layer is used. More preferably, the magneto-optical recording media of Embodiments 1-14, in which one or more garnet ferrite layers and one or more spinel ferrite layers (or rutile-type oxide layers or hematite layers) are layered together by spattering or CVD method are used.

When data are recorded or read from the magneto-optical recording medium 11 by use of the magneto-optical recording and playback device of Embodiment 15, the wavelength of the light beam emitted from the light source for recording 21 is set to be shorter than a certain standard value and the wavelength of the light beam emitted from the light source for reading 23 is set to be longer than the standard value. The standard value is appropriately determined according to the properties of the recording layer of the magneto-optical recording medium. If the magneto-optical recording medium having the properties shown in FIG. 21 is used, for example, 500 nm will be employed as the standard value.

Therefore, if the medium having the light absorption property shown in FIG. 21 is used as the magnetic-optical recording medium 11 in Embodiment 15, it is preferable to adopt an argon laser which can emit a light beam with a wavelength of around 480 nm as the light source for recording 21 and to adopt an ordinary red semiconductor laser which can emit a light beam with a wavelength of 500 to 700 nm as the light source for reading 23. Data recording using a light beam with a wavelength of around 480 nm makes efficient recording possible because the absorption rate of the recording layer increases. On the other hand, data reading using a light beam with a wave length of 630 nm, for example, makes efficient receiving of reflections possible because the absorption rate of the recording layer for the wavelength becomes relatively small. Accordingly, sufficient reflected light can be received without radiation by an excessively powerful light beam.

FIG. 23 shows an optical system outline of another embodiment (hereunder, referred to as "Embodiment 16") of the magneto-optical recording and playback device of the present invention. Embodiment 16 is different from Embodiment 15 with regard to the point of the wavelength conversion element 62 disposed on the pass between the second collimator lens 24 and the second beam splitter 42. In Embodiment 16, the same type of light sources can be used as the light source for recording 21 and for reading 23 because the wavelength conversion element 62 is set across the pass of light beam for playback.

In other words, if light sources which emit the light with the same wavelength are used as the light sources for recording 21 and reading 23, the wavelength of the light beam for reading can be converted to a longer one which is scarcely absorbed by the magneto-optical recording medium 11 by use of the wavelength conversion element 62. Therefore, consumption of energy for playback can be reduced because it is not necessary to radiate a high power light beam onto the magneto-optical recording medium 11, which also enables to extend the life of the medium. Incidentally, the wavelength of the light beam for recording may be converted into a shorter one by disposing the wavelength conversion element 62 on the pass of the light beam for recording.

FIG. 24 shows an optical system outline of another embodiment (hereunder, referred to as "Embodiment 17") of the magneto-optical recording and playback device of the present invention. In Embodiment 17, the light beams for recording and for reading, which have different wavelengths, are provided only by the common light source 25.

In Embodiment 17, a titanium sapphire laser is employed as the common light source 25 for two light beams for recording and reading data. The light beam emitted from the common light source 25 is guided into the beam splitter 43 via the first collimator lens 22 and is split into the two beams of transmitted and reflected lights, according to the direction of its polarization. The beam of transmitted light is focused on the recording layer of the magneto-optical recording medium 11 through the first half mirror 46 and the objective lens 44 in sequence, and is used for recording data.

On the other hand, the beam of reflected light is guided into the non-linear optical element 63 and its wavelength is doubled. After that, the beam of reflected light is focused on the recording layer of the magneto-optical recording medium 11 via the same pass of the beam of transmitted light after passing through the reflection mirror 45, band pass filter 64 and second half mirror 47. The light reflected on the recording layer is guided into the light detector 31 through the same pass of Embodiment 15. Accordingly, the production cost can be reduced as compared to the case in which two separate light sources are used for recording and reading each.

In Embodiment 17, any other conversion means instead of the non-linear optical element 63 can be used if it is capable of converting the wavelength of a part of light beam emitted from the common light source 25. Incidentally, it is possible to shift the wavelength of a part of light beam emitted from the common light source 25 to a shorter wavelength by another non-linear optical element or the like for recording, and to use the other part of the light beam for reading.

What is claimed is:

1. Manufacturing method of a magneto-optical recording medium having a recoding layer and a reflective layer on a substrate, the recording layer having a layered structure in which a garnet ferrite layer, and at least one underlayer for the garnet ferrite layer selected from the group consisting of a spinel ferrite layer, rutile-type oxide layer and a hematite layer are layered, characterized by comprising the steps of:

forming said underlayer on said substrate, heat-treating the underlayer, forming said garnet ferrite layer adjacent to the underlayer, and heat-treating the garnet ferrite layer at a temperature of 500 to 700° C., thereby reducing internal compressive stress of the garnet ferrite layer by tensile stress provided from the underlayer.

2. Manufacturing method of a magneto-optical recording medium having a recording layer and a reflective layer on a substrate, the recording layer having a layered structure in which a garnet ferrite layer, and at least one underlayer for the garnet ferrite layer selected from the group consisting of a spinel ferrite layer, rutile-type oxide layer and a hematite layer are layered on tracks on which data are recorded, characterized by comprising the steps of:

forming said underlayer on said substrate, heat-treating the underlayer, forming said garnet ferrite layer adjacent to the underlayer, and heat-treating the garnet ferrite layer at a temperature of 600 to 630° C., thereby reducing internal compressive stress of the garnet ferrite layer by tensile stress provided from the underlayer, and magneto-optical properties are provided only to the tracks.

* * * * *